(12) United States Patent
Iwase et al.

(10) Patent No.: US 11,250,873 B2
(45) Date of Patent: Feb. 15, 2022

(54) INFORMATION PROCESSING DEVICE AND INFORMATION PROCESSING METHOD

(71) Applicant: Sony Corporation, Tokyo (JP)

(72) Inventors: Hiro Iwase, Kanagawa (JP); Shinichi Kawano, Tokyo (JP); Mari Saito, Kanagawa (JP); Yuhei Taki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/633,161

(22) PCT Filed: Apr. 24, 2018

(86) PCT No.: PCT/JP2018/016513
§ 371 (c)(1),
(2) Date: Jan. 23, 2020

(87) PCT Pub. No.: WO2019/026360
PCT Pub. Date: Feb. 7, 2019

(65) Prior Publication Data
US 2021/0158836 A1 May 27, 2021

(30) Foreign Application Priority Data
Jul. 31, 2017 (JP) .............................. JP2017-148167

(51) Int. Cl.
*G10L 25/54* (2013.01)
*G10L 15/22* (2006.01)
(Continued)

(52) U.S. Cl.
CPC .............. *G10L 25/54* (2013.01); *G10L 15/22* (2013.01); *G10L 21/028* (2013.01); *G10L 25/84* (2013.01)

(58) Field of Classification Search
CPC ....... G10L 25/54; G10L 21/028; G10L 15/22; G10L 25/84; H04N 21/4325; H04N 21/8649
(Continued)

(56) References Cited

U.S. PATENT DOCUMENTS

2014/0150002 A1* 5/2014 Hough ............... H04N 21/2668
725/9
2016/0154625 A1* 6/2016 Stout ................ H04N 21/47202
715/716
(Continued)

FOREIGN PATENT DOCUMENTS

JP 10-214268 A 8/1998
JP 10214268 A * 8/1998
(Continued)

OTHER PUBLICATIONS

International Search Report and Written Opinion dated Jul. 31, 2018 for PCT/JP2018/016513 filed on Apr. 24, 2018, 13 pages including English Translation of the International Search Report.
(Continued)

*Primary Examiner* — Melur Ramakrishnaiah
(74) *Attorney, Agent, or Firm* — Xsensus LLP

(57) ABSTRACT

Provided is an information processing device including an output control unit that controls presentation of content to a user, and when a non-viewing/listening period is detected in a viewing and listening behavior of the user corresponding to the content, causes a summary of the content to be output. The output control unit determines an amount of information in the summary of the content, based on the length of the non-viewing/listening period. Moreover, provided is an information processing method including: by a processor, controlling presentation of content to a user; and when a non-viewing/listening period is detected in a viewing and listening behavior of the user corresponding to the content,
(Continued)

causing a summary of the content to be output. The causing the summary of the content to be output further includes determining an amount of information in the summary of the content, based on the length of the non-viewing/listening period.

17 Claims, 15 Drawing Sheets

(51) Int. Cl.
  *G10L 21/028* (2013.01)
  *G10L 25/84* (2013.01)
(58) Field of Classification Search
  USPC .......................................................... 700/94
  See application file for complete search history.

(56) References Cited

U.S. PATENT DOCUMENTS

| | | | | |
|---|---|---|---|---|
| 2016/0232215 | A1* | 8/2016 | Mochizuki | G06F 16/345 |
| 2016/0261929 | A1* | 9/2016 | Lee | H04N 21/23418 |
| 2017/0257669 | A1* | 9/2017 | Liu | H04N 21/2668 |
| 2017/0374120 | A1* | 12/2017 | Vishnia | H04N 21/472 |

FOREIGN PATENT DOCUMENTS

| | | | | | |
|---|---|---|---|---|---|
| JP | | 2003239311 | A | * | 8/2003 ............. E02D 29/14 |
| JP | | 2003-259311 | A | | 9/2003 |
| JP | | 2003259311 | A | * | 9/2003 |
| JP | | 2004-088384 | A | | 3/2004 |
| JP | | 2005-295343 | A | | 10/2005 |
| JP | | 2005295343 | A | * | 10/2005 |
| JP | | 2006-155125 | A | | 6/2006 |
| JP | | 2006-333451 | A | | 12/2006 |
| JP | | 2011-061733 | A | | 3/2011 |
| JP | | 2011061733 | A | * | 3/2011 |
| JP | | 2016-504836 | A | | 2/2016 |
| WO | | 2007/113580 | A1 | | 10/2007 |
| WO | | 2015/045158 | A1 | | 4/2015 |

OTHER PUBLICATIONS

Kato, Y., et al., "Hierarchical teleconference system with user's nomadic," Multimedia, Distributed, Cooperative and Mobile (DICOMO'99) Symposium, IPSJ Symposium Series, vol. 99, No. 7, Jun. 30, 1999, pp. 97-102 (with English Abstract ).

Masumitsu, K., et al., "Personalized video summarization using importance score," The Transactions of the Institute of Electronics, Information and Communication Engineers, vol. J84-D-II, No. 8, pp. 1848-1885.

Kato, Y., et al., "Hierarchical Teleconference System with User's Nomadic," Multimedia, Distributed, Cooperative and Mobile (DICOMO'99) Symposium, IPSJ Symposium Series, vol. 99, No. 7, Jun. 30, 1999, 26 pages (Resubmitting with English translation.).

Masumitsu, K., et al., "Personalized Video Summarization Using Importance Score," The Transactions of the Institute of Electronics, Information and Communication Engineers, vol. J84-D-II, No. 8, Jul. 25-Aug. 1, 2001, 23 pages (Resubmitting with English translation.).

* cited by examiner

FIG.14
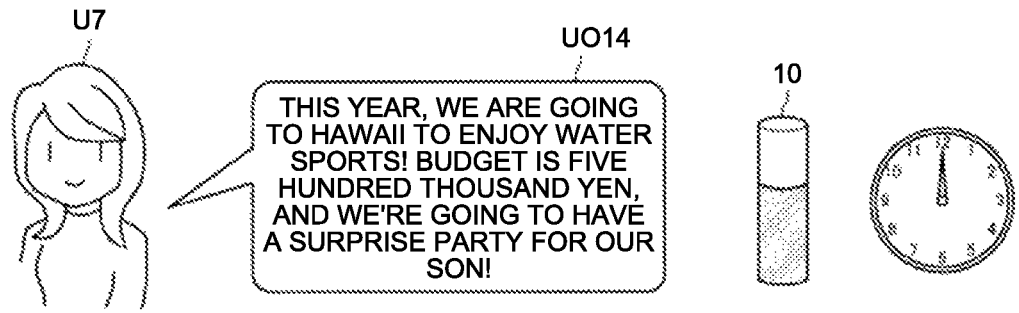
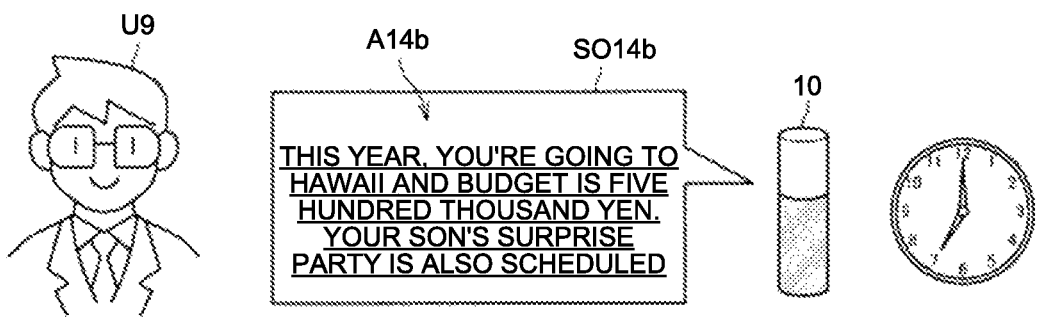

INFORMATION PROCESSING DEVICE AND INFORMATION PROCESSING METHOD

CROSS-REFERENCE TO RELATED APPLICATIONS

The present application is based on PCT filing PCT/JP2018/016513, filed Apr. 24, 2018, which claims priority to JP 2017-148167, filed Jul. 31, 2017, the entire contents of each are incorporated herein by reference.

FIELD

The present disclosure relates to an information processing device and an information processing method.

BACKGROUND

In recent years, various devices that present information to users in voice and visual information have been growing increasingly. Moreover, a technology has been developed to improve the convenience of users, when the presentation of information is interrupted or resumed. For example, Patent Literature 1 discloses a technology for controlling the resume position of speech to be resumed according to the interruption time, at the time when voice speech is resumed.

CITATION LIST

Patent Literature

Patent Literature 1: JP 2011-227236 A

SUMMARY

Technical Problem

However, in the technology disclosed in Patent Literature 1, it is sometimes difficult for a user to correctly associate the contents of speech before being interrupted with the contents of resumed speech, and to properly interpret the intention of the entire speech.

Thus, the present disclosure proposes new and improved information processing device and information processing method that can allow a user to effectively perceive the flow of content.

Solution to Problem

According to the present disclosure, an information processing device is provided that includes: an output control unit that controls presentation of content to a user, and when a non-viewing/listening period is detected in a viewing and listening behavior of the user corresponding to the content, causes a summary of the content to be output, wherein the output control unit determines an amount of information in the summary of the content, based on a length of the non-viewing/listening period.

Moreover, according to the present disclosure, an information processing method is provided that includes: by a processor, controlling presentation of content to a user; and when a non-viewing/listening period is detected in a viewing and listening behavior of the user corresponding to the content, causing a summary of the content to be output, wherein the causing the summary of the content to be output further includes determining an amount of information in the summary of the content, based on a length of the non-viewing/listening period.

Advantageous Effects of Invention

As described above, with the present disclosure, it is possible to allow a user to effectively perceive the flow of content.

It is to be noted that the effects described above are not necessarily limitative. With the effects described above, or in place of the effects described above, any of the effects described in the present specification or the other effects that may be grasped from the present specification may be achieved.

BRIEF DESCRIPTION OF DRAWINGS

FIG. 14 is a diagram for explaining a modification of the present disclosure according to the embodiment.

DESCRIPTION OF EMBODIMENTS

Figure 1:
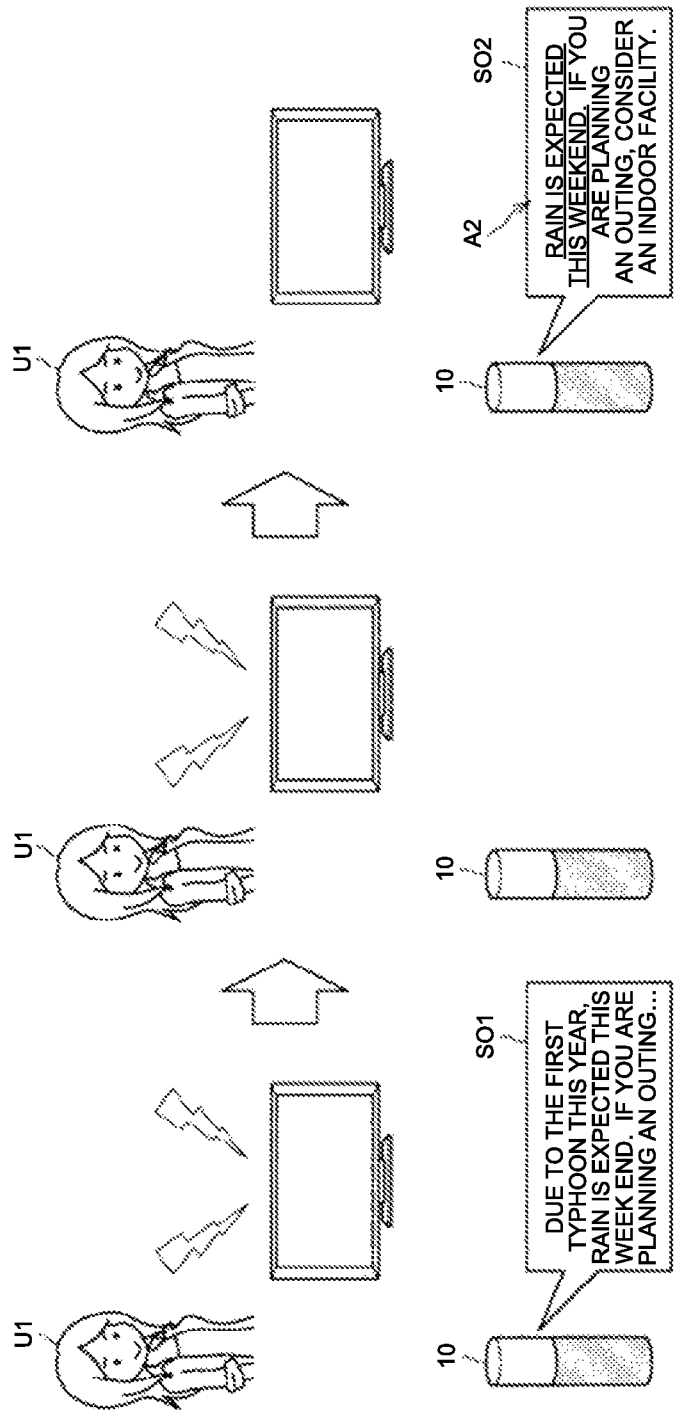
FIG. 1 is a diagram for explaining an overview of a technical idea according to the present disclosure.

Hereinafter, preferred embodiments of the present disclosure will be described in detail, with reference to the accompanying drawings. In the present specification and drawings, the same reference numerals denote the components having substantially the same functional configuration, and the repeated description thereof will be omitted.

The description will be made in the following order.

1. Overview of Technical Idea according to Present Disclosure
2. First Embodiment
    2.1. Example of System Configuration
    2.2. Example of Functional Configuration of Information Processing Terminal 10
    2.3. Example of Functional Configuration of Information Processing Server 20
    2.4. Details of Output Control
    2.5. Flow of Control
3. Second Embodiment
    3.1. Overview of Second Embodiment
    3.2. Details of Output Control
    3.3. Flow of Control
4. Modification
5. Example of Hardware Configuration
6. Conclusion

1. Overview of Technical Idea According to Present Disclosure

In recent years, various devices that present information to users have been growing increasingly. For example, such devices include an agent device that presents information to users through voice speech and visual information. For example, the agent device can read aloud news and a message to a user, and output a response to a user's inquiry through voice speech and visual information.

However, viewing and listening behavior of a user who is presented with information from the agent device and the like may lack integrity due to various factors. For example, when the presentation of information is temporarily interrupted, and then resumed again, the user may have forgotten the information output before the interruption, or may take time to recollect the information. In this case, the user cannot properly interpret the intention of the information output after the information is resumed, or the intention of the entire information.

Moreover, lack of integrity may occur when the user is away from his/her seat, absent, or the like. For example, while the agent device is outputting information, a user may move to a location away from the agent device. When the user returns to the vicinity of the agent device again, the user cannot identify the information output while he/she was away from his/her seat. Moreover, because the user does not identify the information while he/she was away from his/her seat, it will be difficult for the user to interpret the intention of the information to be output thereafter.

Furthermore, a similar situation to the above may occur when the viewing and listening behavior of a user is blocked by the surrounding noise and the like. For example, when a user cannot pick up a part of voice speech due to noise, the user may not be able to properly interpret the contents of voice speech to be output thereafter.

In this manner, in a series of viewing and listening behavior of a user, when there is a period during which the user is not viewing or listening the presented information (hereinafter, may also be referred to as a non-viewing/listening period), the user may not be able to understand the presented information, may misunderstand the information, or the like.

The technical idea according to the present disclosure has been conceived in view of the points described above, and even if there is a period during which the user is not viewing or listening the content, it is possible to allow the user to perceive the flow of content.

Consequently, one of the features of the information processing device that implements an information processing method according to one embodiment of the present disclosure is to output a summary of content, when a non-viewing/listening period is detected in the user's viewing and listening behavior corresponding to the content. Moreover, one of the features of the information processing device according to one embodiment of the present disclosure is to determine an amount of information in a summary of content, on the basis of the length of the non-viewing/listening period.

FIG. 1 is a diagram for explaining an overview of a technical idea according to the present disclosure. The left side of FIG. 1 illustrates voice speech SO1 according to news content output by an information processing terminal 10, a user U1 who is viewing or listening the voice speech SO1, and a television device producing sound in the vicinity of the information processing terminal 10. In this example, the information processing terminal 10 is an information processing device that outputs content, on the basis of control performed by an information processing server 20.

Under these circumstances, the information processing server 20 determines that the user U1 is not picking up or may not be able to pick up the voice speech SO1, due to the sound output from the television device. Thus, the information processing server 20 causes the information processing terminal 10 to interrupt the output of the voice speech SO1. The middle part of FIG. 1 illustrates a state when the information processing terminal 10 has interrupted the output of the voice speech SO1, on the basis of the control performed by the information processing server 20.

Then, when the surrounding sound produced by the television device falls below a predetermined value, the information processing server 20 causes the information processing terminal 10 to resume the output of the content. Under these circumstances, as illustrated in the right side of FIG. 1, the information processing server 20 according to one embodiment of the present disclosure may cause the information processing terminal 10 to output voice speech SO2 including a summary A2 of the contents of the voice speech SO1 output before the interruption, in addition to the rest of content. As will be described below, the information processing server 20 may determine the amount of information in the summary A2, on the basis of the length, the number of times, the factor, and the like of the non-viewing/listening period.

With the function of the information processing server 20 according to one embodiment of the present disclosure described above, even when the interruption period of the presentation of content performed by the information processing terminal 10 is long, and the user U1 does not remember the contents of the voice speech SO1 completely, the user U1 can naturally understand the flow of the voice speech SO1 and the voice speech SO2. Moreover, the user U1 can properly interpret the intention of the entire content.

The overview of the technical idea of the present disclosure has been described. Hereinafter, a specific example of a configuration and control for implementing the technical idea of the present disclosure will be described in detail.

2. First Embodiment

2.1. Example of System Configuration

First, a first embodiment of the present disclosure will be described. In the first embodiment of the present disclosure, the information processing server 20 determines an amount of information in the summary, on the basis of an interruption period of the presentation of content performed by the information processing terminal 10.

Figure 2:
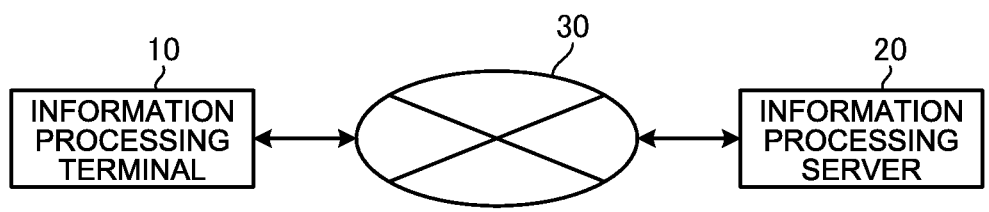
FIG. 2 is a block diagram illustrating an example of a configuration of an information processing system according to one embodiment of the present disclosure.

FIG. 2 is a block diagram illustrating an example of a configuration of an information processing system according to the present embodiment. Referring to FIG. 2, the information processing system according to the present embodiment includes the information processing terminal 10 and the information processing server 20. Moreover, the information processing terminal 10 and the information processing server 20 are connected via a network 30 so as to be able to perform information communication with each other.

Information Processing Terminal 10

The information processing terminal 10 according to the present embodiment is an information processing device that presents content to a user, on the basis of control performed by the information processing server 20. Moreover, one of the features of the information processing terminal 10 according to the present embodiment is to output a summary generated by the information processing terminal 10 in addition to the subsequent information of the content, when the content is resumed after being interrupted.

The content according to the present embodiment indicates various types of information presented to a user. For example, the content according to the present embodiment includes a message, news, a notification, an alert, advertisement, video and voice with a story, a response to a user's inquiry, and the like.

The information processing terminal 10 according to the present embodiment may be implemented as various devices each having a function of outputting the content as described above. For example, the information processing terminal 10 according to the present embodiment may also be a mobile phone, a smartphone, a tablet, a wearable device, a general purpose computer, a stationary type or an autonomous mobile type dedicated device, and the like.

Information Processing Server 20

The information processing server 20 according to the present embodiment is an information processing device that controls presentation of content to a user performed by the information processing terminal 10. It is to be noted that when a non-viewing/listening period is detected in the user's viewing and listening behavior corresponding to the content, the information processing server 20 according to the present embodiment causes the information processing terminal 10 to output a summary of the content.

Under these circumstances, the information processing server 20 according to the present embodiment can determine the amount of information, in other words, the length and contents of the summary, on the basis of the length, the number of times of detection, the occurrence factor, and the like of the non-viewing/listening period described above. The non-viewing/listening period according to the present embodiment indicates an interruption period of the presentation of content performed by the information processing terminal 10.

Network 30

The network 30 has a function to connect the information processing terminal 10 and the information processing server 20. The network 30 may also include a public line network such as Internet, a telephone line network, and a satellite communication network; various local area networks (LANs) including Ethernet (registered trademark); a wide area network (WAN); and the like. Moreover, the network 30 may include a dedicated network such as an Internet Protocol-Virtual Private Network (IP-VPN) and the like. Furthermore, the network 30 may include a wireless communication network such as Wi-Fi (registered trademark) and Bluetooth (registered trademark).

An example of the configuration of the information processing system according to the present embodiment has been described. The configuration described above with reference to FIG. 2 is merely an example, and the configuration of the information processing system according to the present embodiment is not limited to the example. For example, the functions of the information processing terminal 10 and the information processing server 20 according to the present embodiment may be implemented by a single device. The configuration of the information processing system according to the present embodiment may be flexibly modified according to the specification and operation.

2.2. Example of Functional Configuration of Information Processing Terminal 10

Figure 3:
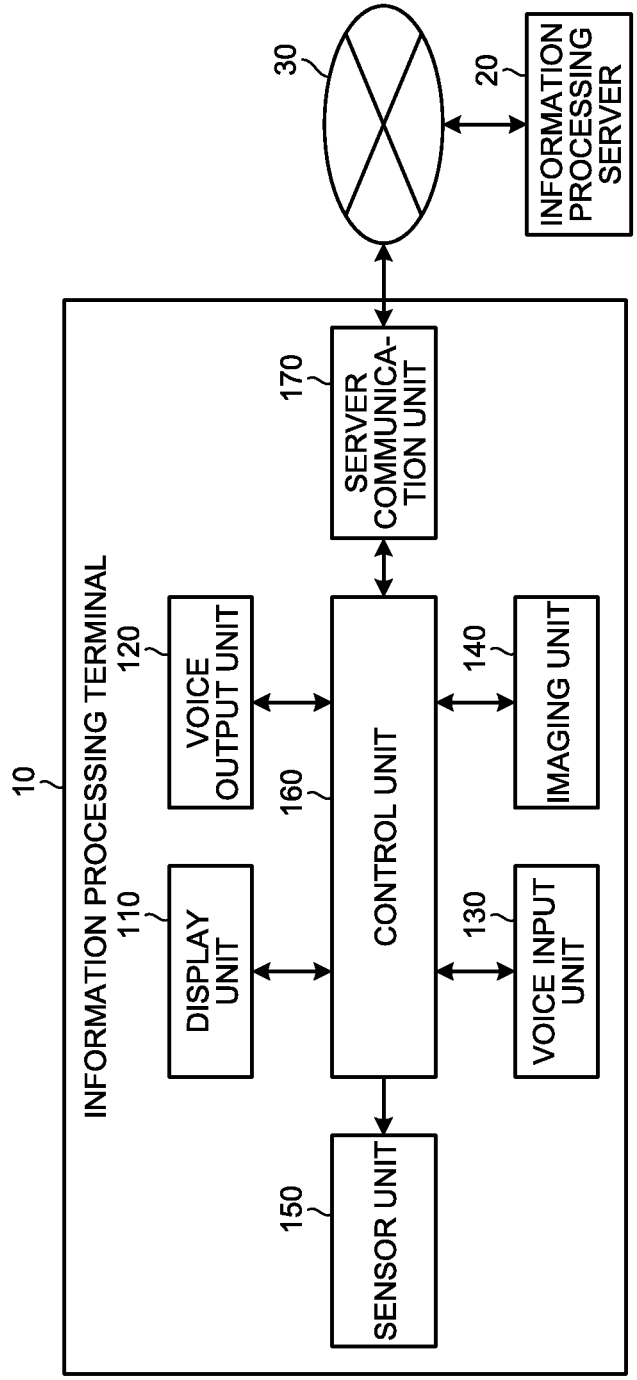
FIG. 3 is a block diagram illustrating an example of a functional configuration of an information processing terminal according to the embodiment.

Next, an example of a functional configuration of the information processing terminal 10 according to the present embodiment will be described. FIG. 3 is a block diagram illustrating an example of a functional configuration of the information processing terminal 10 according to the present embodiment. Referring to FIG. 3, the information processing terminal 10 according to the present embodiment includes a display unit 110, a voice output unit 120, a voice input unit 130, an imaging unit 140, a sensor unit 150, a control unit 160, and a server communication unit 170.

Display Unit 110

The display unit 110 according to the present embodiment has a function to output visual information such as an image and text. For example, the display unit 110 according to the present embodiment can display the contents and a summary of content, on the basis of control performed by the information processing server 20.

Consequently, the display unit 110 according to the present embodiment includes a display device for presenting visual information and the like. For example, the display device described above includes a liquid crystal display (LCD) device, an organic light emitting diode (OLED) device, a touch panel, and the like. Moreover, the display unit 110 according to the present embodiment may also output visual information by a projection function.

Voice Output Unit 120

The voice output unit 120 according to the present embodiment has a function to output various types of sound including voice speech. For example, the voice output unit 120 according to the present embodiment can output the contents, a summary, and the like of content through voice speech, on the basis of control performed by the information processing server 20. Consequently, the voice output unit 120 according to the present embodiment includes a voice output device such as a speaker and an amplifier.

Voice Input Unit 130

The voice input unit 130 according to the present embodiment has a function to collect sound information such as speech by a user, ambient sound generated in the vicinity of the information processing terminal 10, and the like. The sound information collected by the voice input unit 130 is used by the information processing server 20 to identify voice, the ambient environment, and the like. The voice input unit 130 according to the present embodiment includes a microphone for collecting sound information.

Imaging Unit 140

The imaging unit 140 according to the present embodiment has a function to take an image of a user and the ambient environment. The image taken by the imaging unit 140 is used by the information processing server 20 to identify the user and the ambient environment. The imaging unit 140 according to the present embodiment includes an imaging device capable of taking an image. The image described above includes a moving image in addition to a still image.

Sensor Unit 150

The sensor unit 150 according to the present embodiment has a function to collect various types of sensor information on the ambient environment, and the behavior and status of the user. The sensor information collected by the sensor unit 150 is used by the information processing server 20 to identify the ambient environment, and to identify the behavior and status of the user. For example, the sensor unit 150 includes an optical sensor such as an infrared sensor, an acceleration sensor, a gyro sensor, a magnetic field sensor, a heat sensor, a vibration sensor, a global navigation satellite system (GNSS) signal receiving device, and the like.

Control Unit 160

The control unit 160 according to the present embodiment has a function to control various components in the information processing terminal 10. For example, the control unit 160 controls the activation and termination of the components. Moreover, the control unit 160 can supply a control signal generated by the information processing server 20, to the display unit 110 and the voice output unit 120. Furthermore, the control unit 160 according to the present embodiment may also have a function equivalent to that of an output control unit 230 of the information processing server 20, which will be described below.

Server Communication Unit 170

The server communication unit 170 according to the present embodiment has a function to perform information communication with the information processing server 20 via the network 30. More specifically, the server communication unit 170 transmits the sound information collected by the voice input unit 130, the image information taken by the imaging unit 140, and the sensor information collected by the sensor unit 150, to the information processing server 20. Moreover, the server communication unit 170 receives a control signal and artificial voice according to the output of content and a summary from the information processing server 20.

An example of the functional configuration of the information processing terminal 10 according to the present embodiment has been described. The configuration described above with reference to FIG. 3 is merely an example, and the functional configuration of the information processing terminal 10 according to the present embodiment is not limited to the example. For example, the information processing terminal 10 according to the present embodiment need not necessarily include all the configurations illustrated in FIG. 3. For example, the information processing terminal 10 may not include the display unit 110, the imaging unit 140, the sensor unit 150, or the like. Moreover, as described above, the control unit 160 according to the present embodiment may also have a function equivalent to that of the output control unit 230 of the information processing server 20. The functional configuration of the information processing terminal 10 according to the present embodiment may be flexibly modified according to the specification and operation.

2.3. Example of Functional Configuration of Information Processing Server 20

Figure 4:
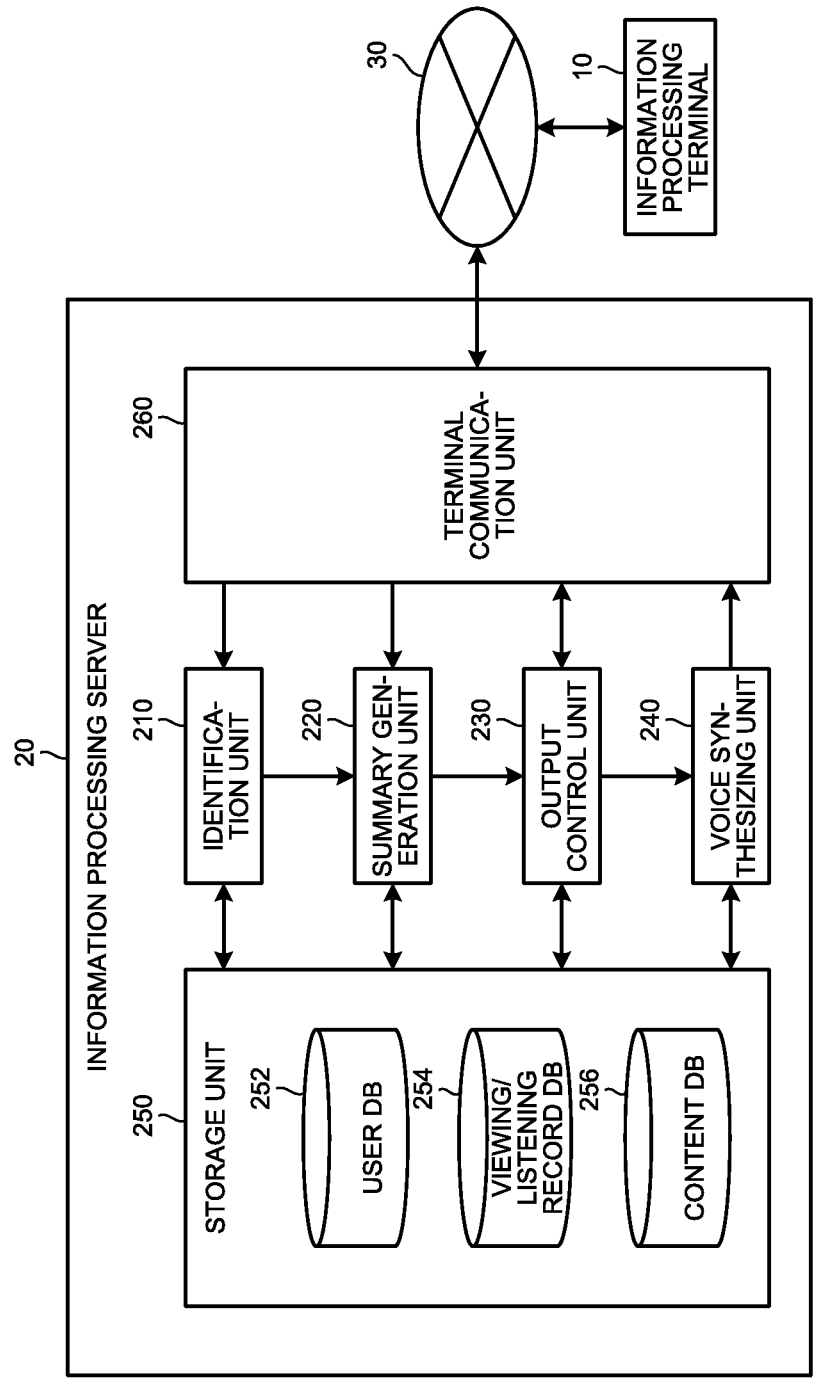
FIG. 4 is a block diagram illustrating an example of a functional configuration of an information processing server according to the embodiment.

Next, an example of a functional configuration of the information processing server 20 according to the present embodiment will be described. FIG. 4 is a block diagram illustrating an example of a functional configuration of the information processing server 20 according to the present embodiment. Referring to FIG. 4, the information processing server 20 according to the present embodiment includes an identification unit 210, a summary generation unit 220, the output control unit 230, a voice synthesizing unit 240, a storage unit 250, and a terminal communication unit 260. Moreover, the storage unit 250 includes a user database (DB) 252, a viewing/listening record DB 254, and a content DB 256.

Identification Unit 210

The identification unit 210 according to the present embodiment has a function to perform various types of identification of the user. For example, the identification unit 210 can identify a user by comparing the speech and image of a user collected by the information processing terminal 10, with the voice features and images of the user stored in advance in the user DB 252.

Moreover, the identification unit 210 can identify the behavior and status of a user, on the basis of the sound information, image, and sensor information collected by the information processing terminal 10. For example, the identification unit 210 may detect the presence of a user in the vicinity of the information processing terminal 10, on the basis of the image and sensor information collected by the information processing terminal 10. Moreover, for example, the identification unit 210 can identify the movement, motion, or other operations performed by the user, as well as the expression and emotion of the user, on the basis of the image and sensor information described above.

Moreover, the identification unit 210 identifies the ambient environment, on the basis of the sound information, image, and sensor information collected by the information processing terminal 10. For example, on the basis of the sound information described above, the identification unit 210 can detect the volume of ambient sound generated in the vicinity of the information processing terminal 10, the conversation between the users, and the like. Moreover, on the basis of the image and sensor information collected by the information processing terminal 10, the identification unit 210 can identify an increase and decrease in the number of users (or people other than the user) in the vicinity of the information processing terminal 10 and the like.

Furthermore, the identification unit 210 according to the present embodiment identifies voice of the user speech, on the basis of the sound information collected by the information processing terminal 10.

Summary Generation Unit 220

The summary generation unit 220 according to the present embodiment has a function to generate a summary from content, on the basis of control performed by the output control unit 230. For example, on the basis of the amount of information (length) and contents indicated by the output control unit 230, the summary generation unit 220 generates a summary of content. Consequently, for example, the summary generation unit 220 according to the present embodiment may also have a function to analyze the contents of content by a natural language process and the like.

Output Control Unit 230

The output control unit 230 according to the present embodiment has a function to control the presentation of content to a user, and when a non-viewing/listening period is detected in the viewing and listening behavior of the user corresponding to the content, cause the information processing terminal 10 to output a summary of the content. Under these circumstances, the output control unit 230 according to the present embodiment determines the amount of information in the summary of the content, on the basis of the length, the number of times of detection, and the generation factor of the non-viewing/listening period. When the content is output by voice speech, the amount of information described above is the speech length of the summary.

Moreover, as described above, the non-viewing/listening period according to the present embodiment may be an interruption period of the content. For example, when the content is interrupted by a user operation, the output control unit 230 according to the present embodiment can acquire time up to when the content is resumed as an interruption period, and cause the summary generation unit 220 to generate a summary with length according to the interruption period.

Furthermore, the output control unit 230 according to the present embodiment may control the presentation of content to be interrupted or resumed. On the basis of the ambient environment and the status of user identified by the identification unit 210, the output control unit 230 can cause the information processing terminal 10 to interrupt the presentation of content.

Under these circumstances, when it is assumed that the user is not identifying or may not be able to identify the contents of content, the output control unit 230 causes the information processing terminal 10 to interrupt the presentation of content. For example, when the ambient sound identified by the identification unit 210 exceeds a threshold, the output control unit 230 determines that the user may not be able to identify the content, and causes the information processing terminal 10 to interrupt the content. With the function of the output control unit 230 according to the present embodiment described above, in a situation when the voice speech is difficult to pick up due to the ambient sound and the like, it is possible to avoid the output of content. Thus, it is possible to effectively reduce a possibility of the user failing to pick up the contents of content. When the ambient sound is sound that can be stopped by the user, the output control unit 230 may urge the user to eliminate the ambient sound, by outputting an effect sound for asking the user to stop the sound, and the like. In this case, by avoiding the interruption, for example, it is possible to present high priority content to the user without delay.

Moreover, for example, on the basis of a doubtful expression, a behavior of tilting the head to the side, and the like of the user identified by the identification unit 210, the output control unit 230 may determine that the user is not identifying the contents of content, and cause the information processing terminal 10 to interrupt the content. With the function of the output control unit 230 according to the present embodiment described above, it is possible to help the users to understand the content, by preventing subsequent information from being presented while the user is not understanding the contents of content, and by outputting the summary.

Moreover, for example, the output control unit 230 may cause the information processing terminal 10 to interrupt the content, on the basis of an increase and decrease in the number of people in the vicinity of the information processing terminal 10 identified by the identification unit 210. For example, when another person is detected in the vicinity of the information processing terminal 10 and the user, while a user is viewing or listening the content, the output control unit 230 may predict a possibility that the user may be distracted by another person, or a conversation may start between another person and the user, and cause the information processing terminal 10 to interrupt the content.

Furthermore, when another user is detected in the vicinity of the information processing terminal 10, while a user is viewing or listening the content, the output control unit 230 may determine that the other user is not grasping the contents of content the presentation of which is already finished, and cause the information processing terminal 10 to interrupt the content. In this case, the output control unit 230 may support the other user to understand the contents of the entire content, by outputting a summary of the contents of the content that has been presented until the other user is detected.

Voice Synthesizing Unit 240

The voice synthesizing unit 240 according to the present embodiment has a function to synthesize artificial voice output from the information processing terminal 10, on the basis of control performed by the output control unit 230.

Storage Unit 250

The storage unit 250 according to the present embodiment includes the user DB 252, the viewing/listening record DB 254, and the content DB 256.

User DB 252

The user DB 252 according to the present embodiment stores therein various types of information on the user. For example, the user DB 252 stores therein facial images and voice features of the user. Moreover, the user DB 252 may store therein information such as sex, age, preference, and tendency of the user.

Viewing/Listening Record DB 254

The viewing/listening record DB 254 according to the present embodiment stores therein the status of content to be interrupted or resumed. For example, on the basis of control performed by the output control unit 230, the viewing/listening record DB 254 stores therein the time when the content is interrupted, and the time when the content is resumed. Moreover, the viewing/listening record DB 254 may store therein the number of times the content is interrupted and the like.

Content DB 256

The content DB 256 according to the present embodiment stores therein the content presented by the information processing terminal 10. For example, the content DB 256 according to the present embodiment stores therein content such as news, advertisement, and a moving image. It is to be noted that the content according to the present embodiment may not necessarily be stored in the content DB 256. The output control unit 230 according to the present embodiment may also acquire content from another device via the network 30. Moreover, for example, the output control unit 230 according to the present embodiment may acquire a response generated on the basis of the user's inquiry as content.

Terminal Communication Unit 260

The terminal communication unit 260 according to the present embodiment has a function to perform information communication with the information processing terminal 10 via the network 30. More specifically, the terminal communication unit 260 receives sound information such as speech, image information, and sensor information from the information processing terminal 10. Moreover, the terminal communication unit 260 transmits a control signal generated by the output control unit 230 and artificial voice synthesized by the voice synthesizing unit 240, to the information processing terminal 10.

An example of the functional configuration of the information processing server 20 according to the present embodiment has been described. However, the functional configuration described above with reference to FIG. 4 is merely an example, and the functional configuration of the information processing server 20 according to the present embodiment is not limited to the example. For example, the information processing server 20 need not necessarily include all the configurations illustrated in FIG. 4. The identification unit 210, the summary generation unit 220, the voice synthesizing unit 240, and the storage unit 250 may be provided in another device different from the information processing server 20. The functional configuration of the information processing server 20 according to the present embodiment may be flexibly modified according to the specification and operation.

2.4. Details of Output Control

Next, details of output control performed by the output control unit 230 according to the present embodiment will be described. As described above, the output control unit 230 according to the present embodiment can control content to be interrupted or resumed on the basis of various circumstances. Moreover, the output control unit 230 determines the amount of information and contents of a summary on the basis of the length and the number of times of the interruption period, and causes the summary generation unit 220 to generate a summary. Moreover, the output control unit 230 according to the present embodiment causes the summary generated by the summary generation unit 220 to be output, in addition to the subsequent information of the content when the content is resumed.

Figure 5:
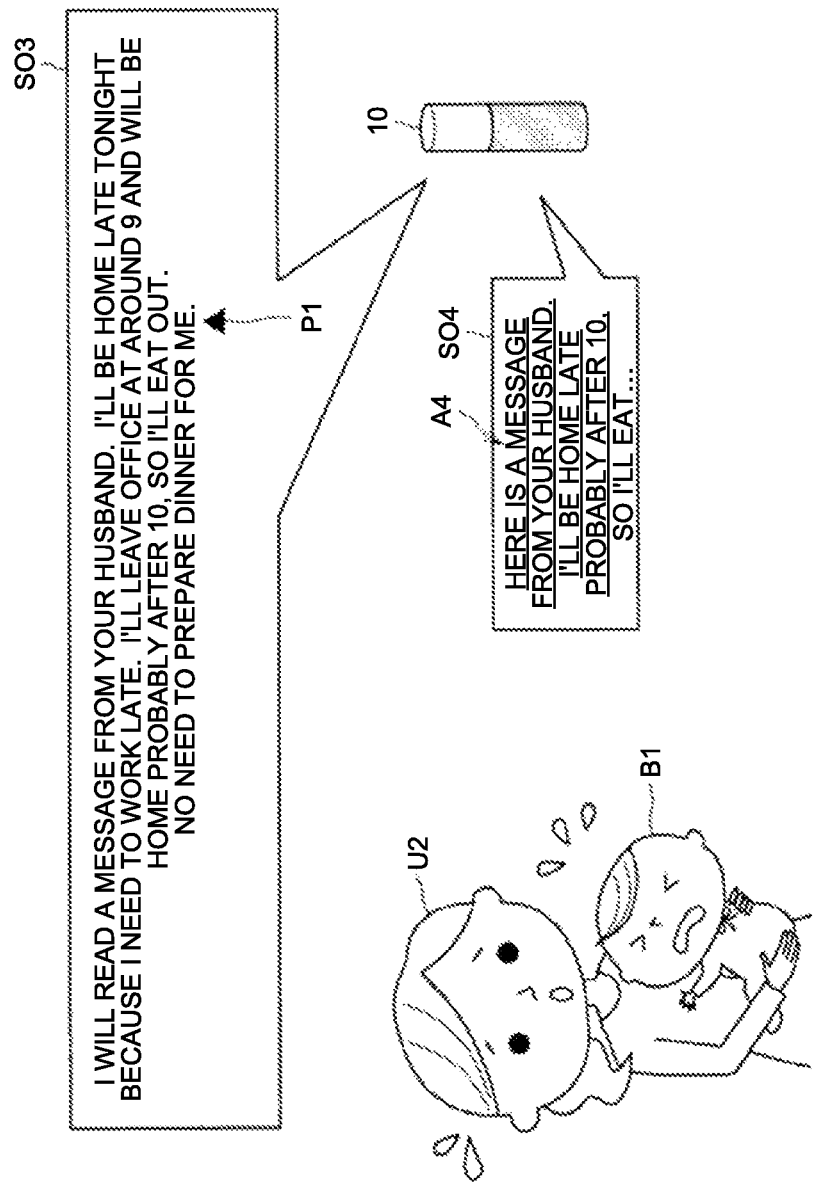
FIG. 5 is a diagram for explaining interruption control of content according to the embodiment.

FIG. 5 is a diagram for explaining an interruption control of content according to the present embodiment. FIG. 5 illustrates voice speech SO3 (content) output by the information processing terminal 10, and a user U2 who is viewing/listening the voice speech SO3. In FIG. 5, the output control unit 230 causes a message transmitted to the user U2 to be output as content.

Under these circumstances, while the voice speech SO3 is being output, it is assumed that a baby B1 of the user U2 has started crying at a point P1. Under these circumstances, the output control unit 230 according to the present embodiment causes the information processing terminal 10 to interrupt the output of the voice speech SO3, on the basis that the ambient noise, in other words, the sound of the crying baby B1 identified by the identification unit 210 exceeds a threshold, and that the identification unit 210 has identified the crying baby B1 from an image.

In this case, the output control unit 230 controls content to be resumed, and causes the voice speech SO4 to be output, on the basis that the volume of the crying sound of the baby B1 has become equal to or less than the threshold, or when it is detected that the baby B1 has stopped crying. Under these circumstances, for example, the output control unit 230 sets the beginning of a phrase or a sentence output at the point P1 as a resume position, and determines the amount of information in the summary on the basis of the length of the interruption period. The output control unit 230 then causes the summary generation unit 220 to generate a summary A4 on the basis of the contents output before the sentence, and the amount of information described above. Moreover, after causing the information processing terminal 10 to output the summary A4 generated by the summary generation unit 220, the output control unit 230 causes the information processing terminal 10 to resume the presentation of content from the resume position described above.

With the function of the output control unit 230 according to the present embodiment described above, the user U2 can view or listen to the subsequent information of the content, while naturally regrasping the contents presented before the interruption. Consequently, the user U2 can easily understand the flow of the entire content.

When content is repeatedly interrupted and resumed in a short period of time, the presentation of a summary may not be advantageous for the user after all. For example, it is assumed that the output control unit 230 determines the amount of information in a summary on the basis of the length of interruption period alone. Under these circumstances, when the interruption period of about the same length is repeated, the same summary will be presented repeatedly. This may cause the user to feel redundant, and lower the concentration. In this case, as a result, the understanding of content by the user may be lowered.

Figure 6:
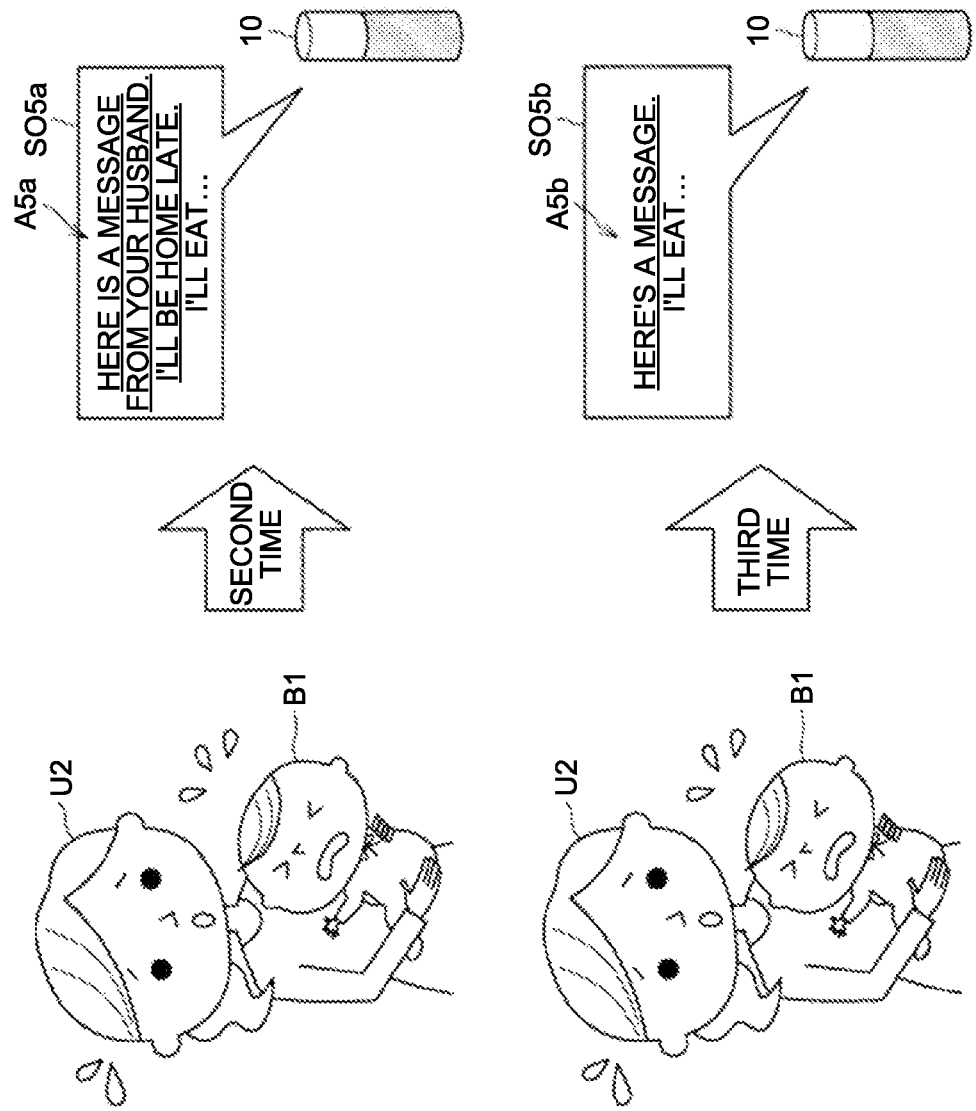
FIG. 6 is a diagram for explaining generation and output of a summary on the basis of the length of an interruption period according to the embodiment.

Consequently, the output control unit 230 according to the present embodiment may determine the amount of information in the summary by taking into account the number of times of interruption period, in addition to the length of the interruption period. FIG. 6 is a diagram for explaining generation and output of a summary on the basis of the length of an interruption period according to the present embodiment.

FIG. 6 illustrates the voice speech output when content is resumed, after the presentation of content is interrupted and resumed as illustrated in FIG. 5, and then interrupted again at around the point P1.

The upper portion of FIG. 6 illustrates voice speech SO5a output by the information processing terminal 10, when there is total of two interruption periods including the state illustrated in FIG. 5. Under these circumstances, the output control unit 230 according to the present embodiment may take into account redundancy, cause the summary generation unit 220 to generate a summary A5a the speech length of which is shorter than that of the summary A4 output when the content is resumed for the first time, and cause the information processing terminal 10 to output the voice speech SO5a including the summary A5a.

Moreover, the lower portion of FIG. 6 illustrates voice speech SO5b output by the information processing terminal 10, when there is total of three interruption periods including the state illustrated in FIG. 5. Under these circumstances, the output control unit 230 according to the present embodiment may take into account redundancy, cause the summary generation unit 220 to generate a summary A5b the speech length of which is further shorter than that of the summary A5a output when the content is resumed for the second time, and cause the information processing terminal 10 to output the voice speech SO5b including the summary A5b.

With the function of the output control unit 230 according to the present embodiment described above, by simplifying the summary on the basis of the number of times of interruption, it is possible to prevent the redundancy of the summary, and support the user to more naturally understand the content.

Figure 7:
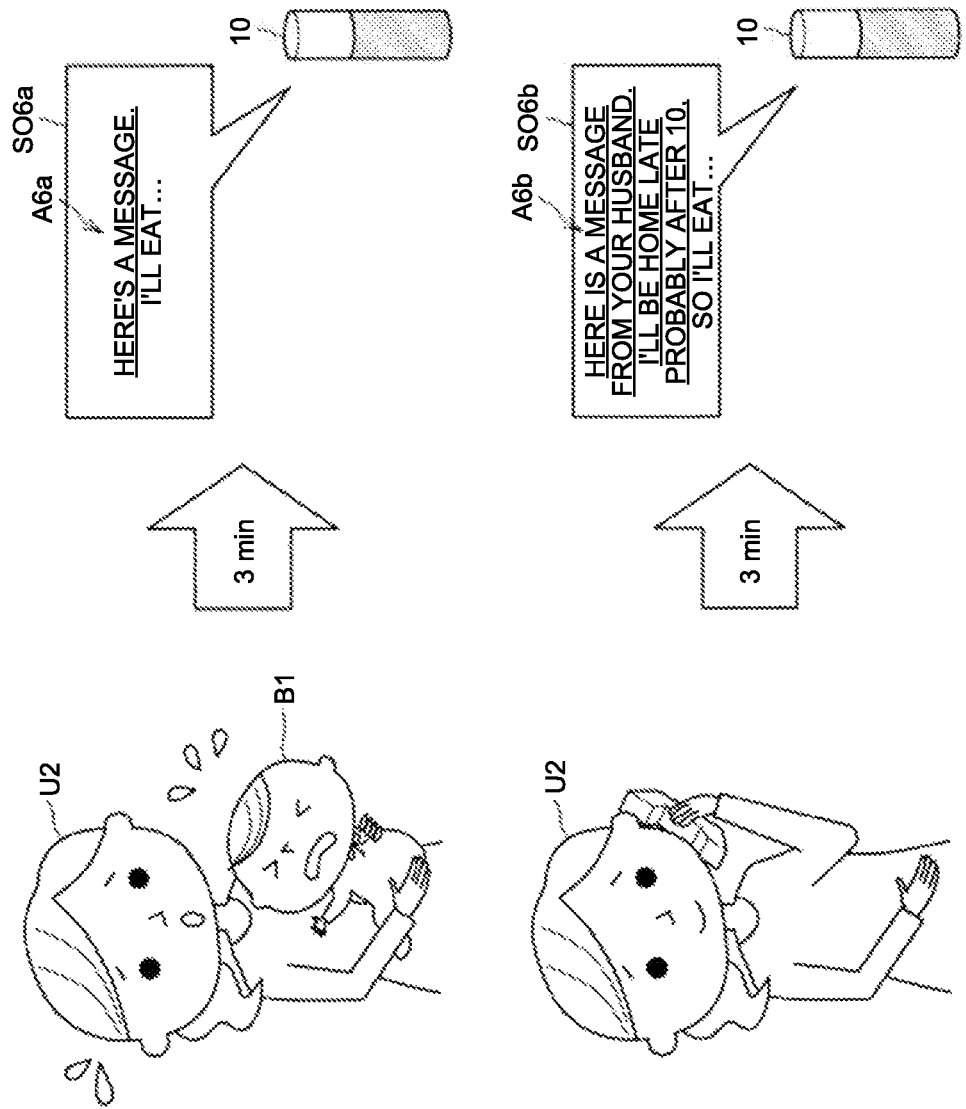
FIG. 7 is a diagram for explaining generation and output of a summary on the basis of the factor of the interruption period according to the embodiment.

Moreover, the output control unit 230 according to the present embodiment can determine the amount of information in the summary, on the basis of the factor of the interruption period. FIG. 7 is a diagram for explaining generation and output of a summary on the basis of the factor of the interruption period according to the present embodiment.

FIG. 7 illustrates voice speech output when the content is resumed, after the presentation of the content is interrupted for a plurality of times including the initial interruption illustrated in FIG. 5, and then interrupted again at around the point P1.

The upper portion of FIG. 7 illustrates voice speech SO6a output by the information processing terminal 10 when the content is resumed, after the content is interrupted when the baby B1 has started crying. Under these circumstances, similar to the summary A5b of the voice speech SO5b illustrated in the lower portion of FIG. 6, the output control unit 230 according to the present embodiment may cause the summary generation unit 220 to generate a simplified summary A6a, and cause the information processing terminal 10 to output the voice speech SO6a including the summary A6a.

The lower portion of FIG. 7 illustrates voice speech SO6b output by the information processing terminal 10, when the length and the number of times of the interruption period the same as those in the upper portion of FIG. 7 are detected. Unlike the upper portion of FIG. 7, the factor of interruption in the lower portion of FIG. 7 may be because the user U2 has started talking on the phone.

Under these circumstances, compared to non-language information such as crying sound, the conversation with another person may tend to easily overwrite the short-term memory of the user U2. Consequently, the output control unit 230 according to the present embodiment may cause the summary generation unit 220 to generate a detailed summary A6b the voice speech length of which is longer than that of the summary A6a of the voice speech SO6a illustrated in the upper portion of FIG. 7, and cause the information processing terminal 10 to output the voice speech SO6b including the summary A6b.

In this manner, the output control unit 230 according to the present embodiment can control the output of the summary having a different amount of information, on the basis of various interruption factors. With the function of the output control unit 230 according to the present embodiment described above, it is possible to improve the understanding of content by the user, by presenting more flexible summary according to the circumstances.

The output control of a summary performed by the output control unit 230 according to the present embodiment has been described. As described above, the output control unit 230 according to the present embodiment can cause the summary generation unit 220 to generate a summary with a different amount of information, on the basis of the length, the number of times, or the generation factor of the interruption period.

Under these circumstances, for example, the output control unit 230 according to the present embodiment may also calculate a summary length score for comprehensively judging the factor described above, and determine the amount of information in the summary to be generated by the summary generation unit 220, on the basis of the value of the summary length score.

For example, when the interruption factor is ambient sound of equal to or more than a threshold, a summary length score S may be calculated as S=T/N. In this example, the above-described T represents the length of interruption period, and N represents the number of times of interruption.

Moreover, for example, when the interruption factor is the behavior of a user, the summary length score S may be calculated so as to be inversely proportional to the degree of behavior, or may be calculated according to the type of behavior.

Furthermore, for example, when the interruption factor is an increase and decrease in the number of people in the vicinity of the information processing terminal 10, the summary length score S may be calculated as S=increased number of people/original number of people.

In this manner, the summary length score S according to the present embodiment may be calculated by taking into account various conditions. Moreover, for example, the calculation method of the summary length score S according to the present embodiment may be suitably designed according to the characteristics of an application and the like.

Figure 8:
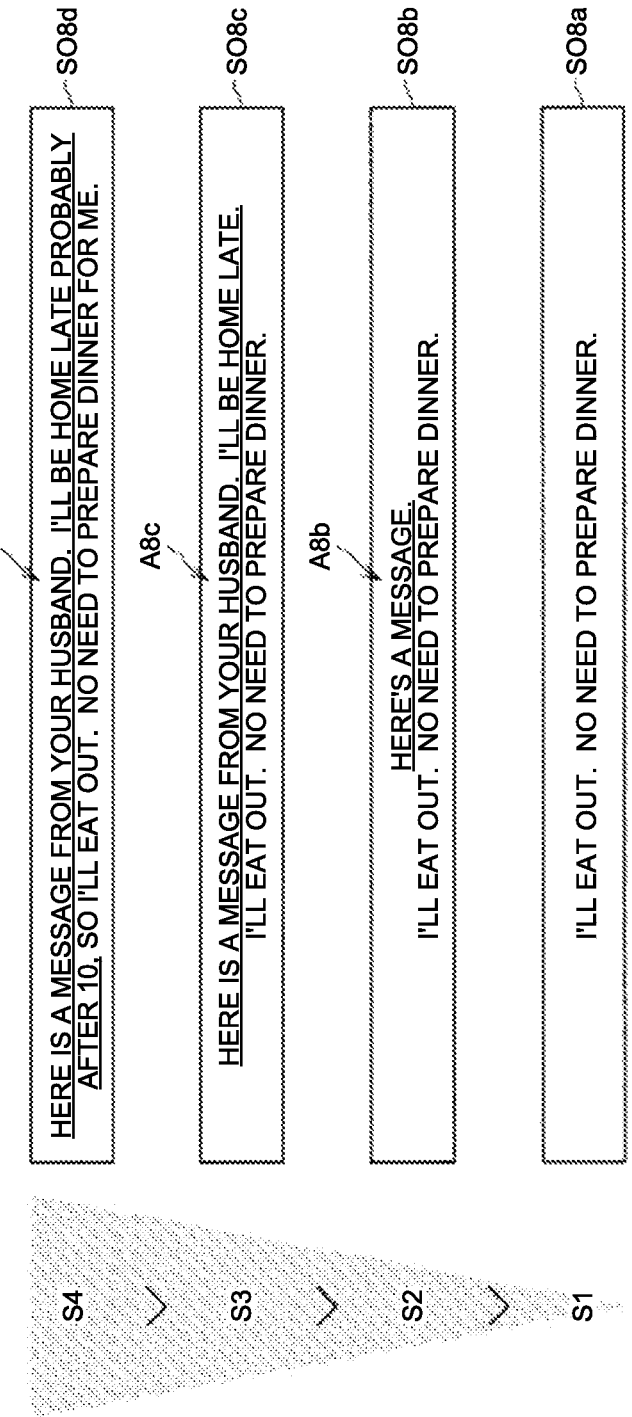
FIG. 8 is a diagram for explaining generation and output of a summary on the basis of a summary length score according to the embodiment.

The output control unit 230 according to the present embodiment can determine the amount of information in the summary to be generated by the summary generation unit 220, on the basis of the summary length score calculated as described above. FIG. 8 is a diagram for explaining generation and output of a summary on the basis of the summary length score.

For example, when the summary length score S corresponds to a level S1, the output control unit 230 may not cause the summary generation unit 220 to generate a summary, and cause the information processing terminal 10 to output voice speech SO8a including the subsequent information of the content alone.

Moreover, when the summary length score S corresponds to a level S2, the output control unit 230 causes the summary generation unit 220 to generate a brief summary A8b, and causes the information processing terminal 10 to output voice speech SO8b including the summary A8b.

Furthermore, when the summary length score S corresponds to a level S3, the output control unit 230 causes the summary generation unit 220 to generate a summary A8c the amount of information of which is greater than that of the summary A8b at the level S2, and causes the information processing terminal 10 to output voice speech SO8b including the summary A8c.

Still furthermore, when the summary length score S corresponds to a level S4, the output control unit 230 causes the summary generation unit 220 to generate a summary A8d more in detail than the summary A8c at the level S3, and causes the information processing terminal 10 to output voice speech SO8d including the summary A8d.

In this manner, the output control unit 230 according to the present embodiment calculates the summary length score on the basis of various conditions, and determines the amount of information in the summary to be generated by the summary generation unit 220 on the basis of the summary length score. With the function of the output control unit 230 according to the present embodiment described above, it is possible to flexibly generate and present a summary according to the circumstances.

It is to be noted that the calculation method of the summary length score and the generation method of the summary on the basis of the summary length score described above are merely examples. For example, the output control unit 230 according to the present embodiment may also cause the summary generation unit 220 to generate a summary by specifying the percentage. Moreover, the output control unit 230 may also cause the summary generation unit 220 to generate a summary including a specific topic, theme, title, and the like. The generation of summary and the output control performed by the output control unit 230 according to the present embodiment can be flexibly modified.

2.5. Flow of Control

Figure 9:
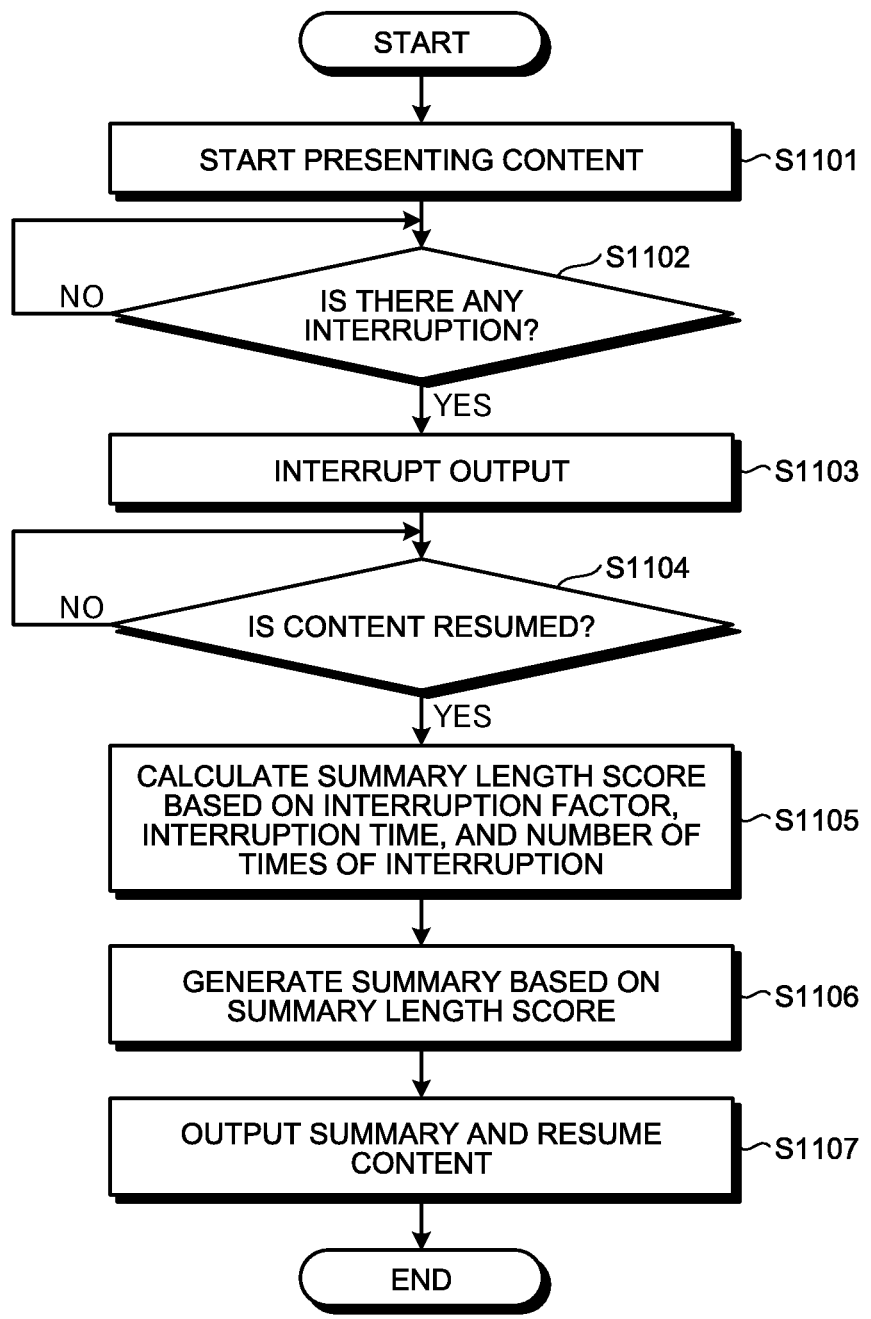
FIG. 9 is a flowchart illustrating a flow of control performed by the information processing server according to the embodiment.

Next, a flow of control performed by the information processing server 20 according to the present embodiment will be described. FIG. 9 is a flowchart illustrating a flow of control performed by the information processing server 20 according to the present embodiment.

Referring to FIG. 9, first, the output control unit 230 of the information processing server 20 causes the information processing terminal 10 to start presenting content (S1101).

At step S1101, when the presentation of content is started, the output control unit 230 monitors the generation of an interruption factor on the basis of the status of the user and ambient environment identified by the identification unit 210 (S1102).

In this process, when the interruption factor of the content is generated (Yes at S1102), the output control unit 230 causes the information processing terminal 10 to interrupt the presentation of content (S1103). The interruption of content may also be performed on the basis of an operation input by the user.

Next, the output control unit 230 keeps monitoring until the interruption factor at step S1103 is eliminated (S1104).

In this process, when the interruption factor of the content is eliminated (Yes at S1104), the output control unit 230 calculates a summary length score on the basis of the interruption factor, interruption time, the number of times of interruption, and the like (S1105). It is to be noted that the content may be resumed on the basis of an operation input by the user.

Then, the output control unit 230 causes the summary generation unit 220 to generate a summary having the amount of information corresponding to the summary length score calculated at step S1105 (S1106).

Next, the output control unit 230 causes the information processing terminal 10 to output the summary generated by the summary generation unit 220 at step S1106, and causes the information processing terminal 10 to resume the content (S1107).

The first embodiment of the present disclosure has been described. As described above, the information processing server 20 according to the first embodiment of the present disclosure can cause a summary having the amount of information corresponding to the interruption period of content to be generated, and cause the summary to be presented to the user when the content is resumed.

In the above, the information processing server 20 mainly controls the voice speech of the content. However, the control performed by the information processing server 20 according to the present embodiment is not limited to the example. The information processing server 20 according to the present embodiment can also control the output of content and a summary by using visual information.

Moreover, for example, the information processing server 20 according to the present embodiment may also control the background sound during the interruption and the like. Under these circumstances, the information processing server 20 can also present which content is being interrupted to the user, by causing the information processing terminal 10 to output the background sound according to the type of content. The information processing server 20 may also cause the information processing terminal 10 to output light with different colors and patterns according to the type of content.

Moreover, in the above, the information processing server 20 mainly generates a summary of the contents presented before the interruption, and causes the information processing terminal 10 to output the summary. Meanwhile, when the content is a message and the like, the information processing server 20 may generate a summary including a title of the message and information on the sender, and cause the information processing terminal 10 to output the summary.

Furthermore, for example, the information processing server 20 may generate a summary including additional information such as "this message continues from the message presented five minutes ago". The information processing server 20 may also control the summary such that the summary does not include expired information. For example, in a situation when a message including information of "I will arrive in five minutes" is interrupted before the information is output, the expired information described above may be generated when five minutes have passed since the interruption period, and the sender of the message may have already arrived at the user's place.

3. Second Embodiment 3.1. Overview of Second Embodiment

Next, a second embodiment of the present disclosure will be described. In the first embodiment, the information processing server 20 controls the generation and output of a summary, on the basis of the interruption period of the content. However, as described above, the non-viewing/listening period in the present disclosure is not limited to the interruption period. The non-viewing/listening period according to the present disclosure may include a non-perceptual period during which the user does not perceive the content.

In this example, the non-perceptual period described above is a period during which the user cannot perceive the contents of content due to some reason, while the content is being presented. For example, when a user has left the vicinity of the information processing terminal 10 while the content is being presented and then come back again, the user cannot perceive the contents of the content being presented while the user is away from his/her seat. In this manner, the non-perceptual period in the present disclosure includes an absence period during which the user has left an area where the content is supplied, while the content is being presented.

Moreover, for example, when the concentration of a user is lowered due to an external factor while the content is being presented, the user may not be able to perceive the contents of the presented content. Consequently, the non-perceptual period in the present disclosure may also include a distraction period during which the user is not concentrating on the information of the content, while the content is being presented.

In this manner, in the viewing and listening behavior of a user corresponding to the content, the integrity may also be lost by the factor other than the interruption. Thus, one of the features of the information processing server 20 according to the second embodiment of the present disclosure is to cause the information processing terminal 10 to output a summary having an amount of information determined on the basis of the length, the number of times of detection, or the factor of the non-perceptual period as described above.

Hereinafter, the features of the information processing server 20 according to the present embodiment described above will be described in detail. In the following explanation, differences from the first embodiment will be mainly described, and the detailed explanation of the components and functions common to the first embodiment will be omitted.

3.2. Details of Output Control

Next, details of output control performed by the output control unit 230 according to the present embodiment will be described. First, output control of a summary on the basis of the absence period performed by the output control unit 230 according to the present embodiment will be described. As described above, the non-perceptual period according to the present embodiment includes the absence period of the user. Under these circumstances, the amount of information in a summary can be determined, on the basis of the length of the absence period or the number of times of detection of the absence period according to the present embodiment described above.

Figure 10:
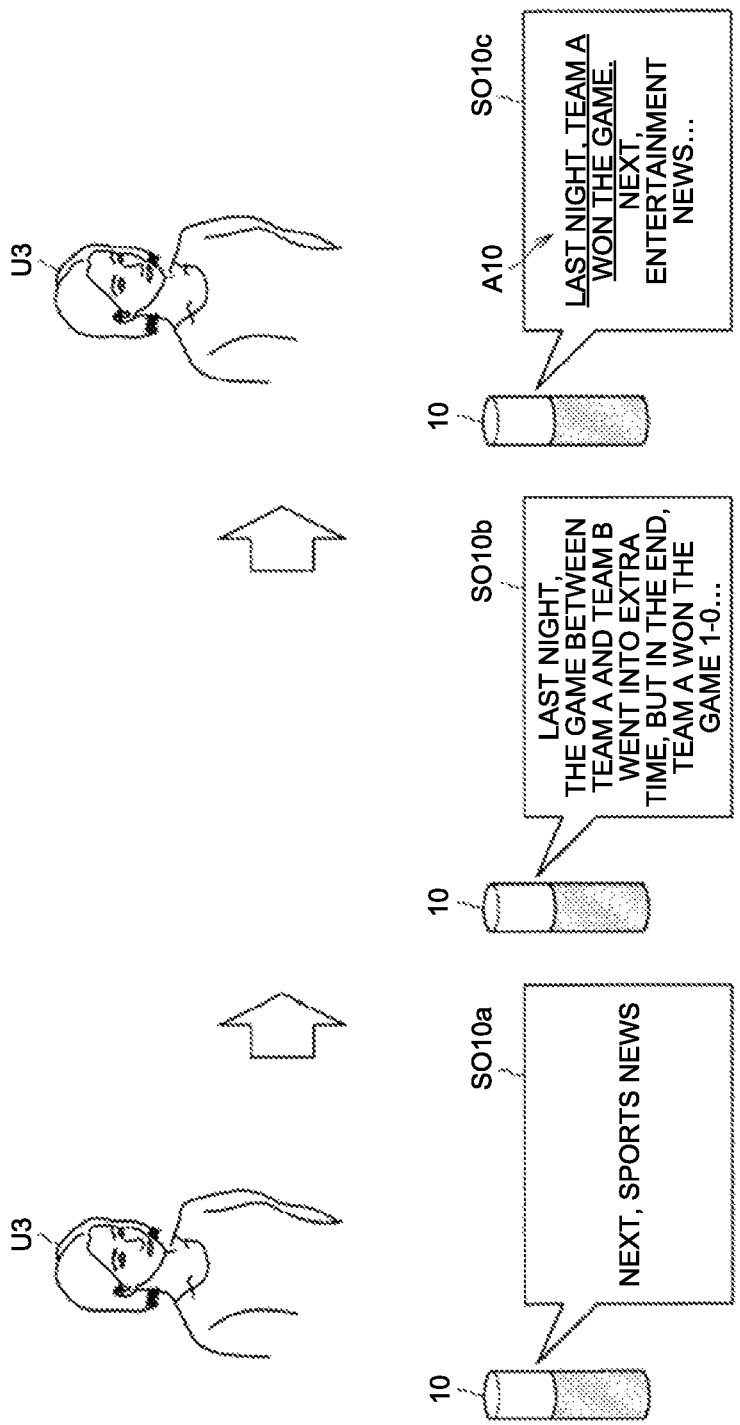
FIG. 10 is a diagram for explaining generation and output of a summary on the basis of an absence period according to the embodiment.

FIG. 10 is a diagram for explaining generation and output of a summary on the basis of an absence period according to the present embodiment. FIG. 10 illustrates voice speech SO10a to SO10c of news content output by the information processing terminal 10, and a user U3 who is viewing or listening the content.

Under these circumstances, the user U3 has temporarily left the vicinity of the information processing terminal 10, while the voice speech SO10b is being output, and then returned to the vicinity of the information processing terminal 10 again, at the timing when the output of the voice speech SO10c is started.

In this case, the output control unit 230 according to the present embodiment sets a period during which the voice speech SO10b is being presented as the absence period, on the basis of absence and return of the user identified by the identification unit 210. Under these circumstances, the output control unit 230 according to the present embodiment may cause the summary generation unit 220 to generate a summary A10 including the amount of information determined on the basis of the length of the absence period described above, and cause the information processing terminal 10 to output the voice speech SO10c including the summary A10.

Focusing on the contents of the summary A10 in FIG. 10, the output control unit 230 has generated the summary including the contents of the voice speech SO10b presented during the absence period. In this manner, the output control unit 230 according to the present embodiment can cause the summary generation unit 220 to generate a summary including the information presented during the non-perceptual period, when the non-perceptual period such as the absence period is finished, and cause the information processing terminal 10 to output the summary.

With the output control unit 230 according to the present embodiment, even when a user is temporarily absent from the vicinity of the information processing terminal 10 due to business and the like, it is possible to provide the user with the summary of contents of the content presented during the absence period. With the function of the output control unit 230 according to the present embodiment described above, the user can easily grasp the flow of the entire content to be presented, by making up the lost viewing/listening experience of the user.

Figure 11:
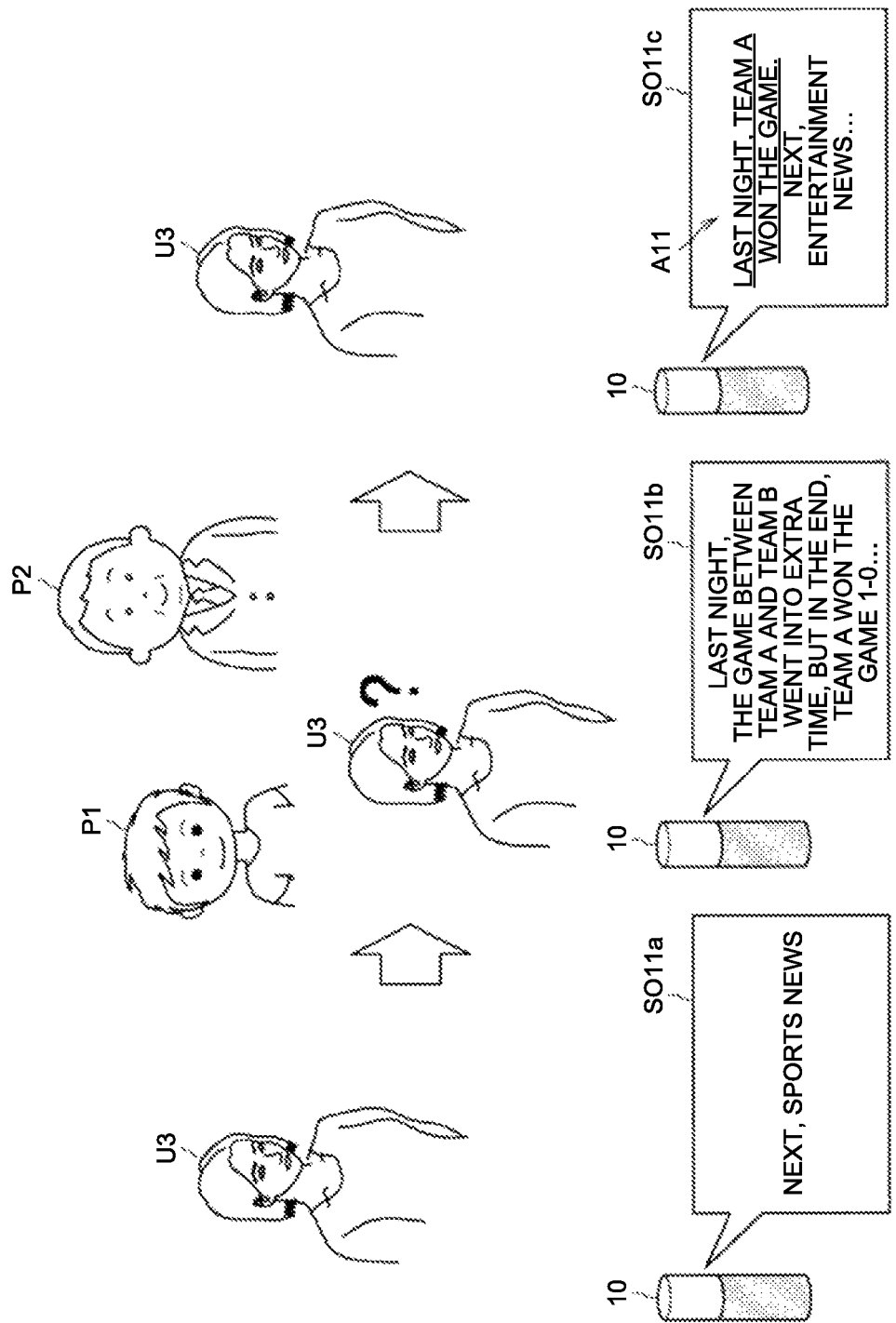
FIG. 11 is a diagram for explaining generation and output of a summary on the basis of a distraction period according to the embodiment.

Next, generation and output of a summary on the basis of the distraction period according to the present embodiment will be described. FIG. 11 is a diagram for explaining generation and output of a summary on the basis of a distraction period according to the present embodiment. Similar to the state illustrated in FIG. 10, FIG. 11 illustrates voice speech SO11a to SO11c of news content output by the information processing terminal 10, and the user U3 who is viewing or listening the content.

Unlike in FIG. 10, in FIG. 11, the user U3 is present in the vicinity of the information processing terminal 10 the whole time the voice speech SO11a to SO11c are being output. However, in the state illustrated in FIG. 11, a person P1 and a person P2 are detected in the vicinity of the user U3 and the information processing terminal 10, while the voice speech SO11b is being output.

Under these circumstances, on the basis that the identification unit 210 has identified the person P1 and the person P2, the output control unit 230 according to the present embodiment determines that the concentration of the user U3 is lowered due to the person P1 and the person P2, and that there is a possibility the user U3 was not able to perceive the voice speech 5011. The output control unit 230 then sets a period during which the person P1 and the person P2 are detected as a distraction period. Under these circumstances, the output control unit 230 according to the present embodiment may cause the summary generation unit 220 to generate a summary A11 including the amount of information determined on the basis of the length of the distraction period described above, and cause the information processing terminal 10 to output the voice speech SO11c including the summary A11.

The output control unit 230 may also set the non-perceptual period on the basis that the identification unit 210 has identified the behavior of the user U3 such as tilting the head to the side or moving closer to the information processing terminal 10.

Focusing on the contents of the summary A11 in FIG. 11, the output control unit 230 has generated a summary including the contents of the voice speech SO11b presented during the non-perceptual period. In this manner, when the non-perceptual period such as the absence period is finished, the output control unit 230 according to the present embodiment can cause the summary generation unit 220 to generate a summary including the information presented during the non-perceptual period, and cause the information processing terminal 10 to output the summary.

With the output control unit 230 according to the present embodiment, even when the user may not have conceived the contents of the presented content, it is possible to provide the user with the summary corresponding to the contents of content presented during the distraction period.

Next, the determination of an amount of information and contents of the summary on the basis of the user's context performed by the output control unit 230 according to the present embodiment will be described.

Figure 12:
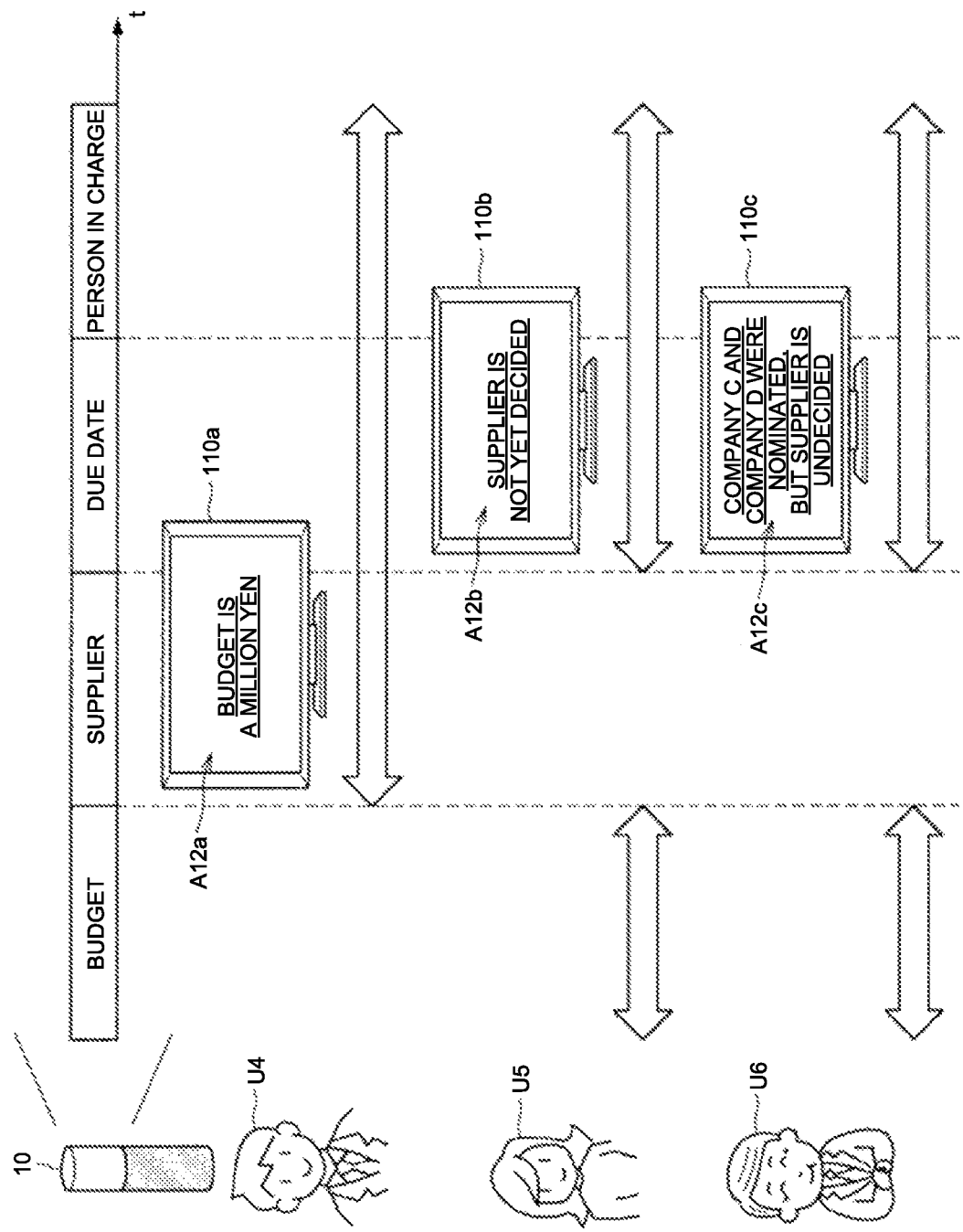
FIG. 12 is a diagram for explaining the determination of an amount of information and contents of a summary, on the basis of a user's context according to the embodiment.

FIG. 12 is a diagram for explaining the determination of an amount of information and contents of a summary, on the basis of a user's context according to the present embodiment. In the example illustrated in FIG. 12, the information processing server 20 may also be a device for controlling the generation and output of minutes of meetings, on the basis of the statement made by the user in a meeting. Moreover, the information processing server 20 may also be a device for causing the information processing terminal 10 to output predetermined contents in a meeting.

The upper portion of FIG. 12 illustrates a plurality of meeting agenda along time t. Moreover, FIG. 12 illustrates users U4 to U6 who have attended the meeting, and arrows each indicating the time during which each of the users U4 to U6 has attended the meeting.

For example, the user U3 is absent from the meeting room while the budget is being discussed. Under these circumstances, the output control unit 230 according to the present embodiment causes the summary generation unit 220 to generate a summary A12a corresponding to the discussed contents on the budget when the user U4 has arrived the meeting room. The output control unit 230 then causes a display unit 110a assigned to the user U4 to display the summary A12a. When the information processing terminal 10 has a voice output function with directivity such as beam forming, the output control unit 230 may cause the information processing terminal 10 to output the summary A12a to the user U4 in voice.

Moreover, the users U5 and U6 are absent from the meeting room, while the supplier is being discussed. In this example, the user U5 is a younger employee and the user U6 is a manager. Under these circumstances, when the users U5 and U6 have returned to the meeting room, the output control unit 230 according to the present embodiment causes the summary generation unit 220 to generate summaries A12b and A12c of the contents that have been discussed on the supplier. The output control unit 230 then causes display units 110b and 110c assigned to the users U5 and U6 to display the summaries A12b and A12c.

In this example, referring to the summaries A12b and A12c illustrated in FIG. 12, the amount of information differs between the summaries A12b and A12c. In other words, the output control unit 230 according to the present embodiment causes the summary generation unit 220 to generate the summaries A12b and A12c with different amounts of information, on the basis of the managerial position of the users U5 and U6, and causes the display units 110b and 110c to output the summaries. More specifically, the output control unit 230 causes a simple summary A12b to be presented to the user U5 who is a younger employee, and causes a more detailed summary A12c to be presented to the user U6 who is a manager.

In this manner, for example, depending on the attribute of a user such as a managerial position, even when the absence period is the same, the level of granularity expected in the summary may differ. Consequently, the output control unit 230 according to the present embodiment may determine the amount of information and contents of the summary, on the basis of the user's context of the user. In this example, the context described above includes attributes such as age, sex, and managerial position of the user; preference and characteristics of the user; the status of the user; and the like.

For example, the output control unit 230 according to the present embodiment may also control the summary such that a simple summary with an easy vocabulary and tone is presented to a young user. Moreover, when the user is in hurry, the output control unit 230 may control the summary such that a simple summary including important contents alone is presented.

With the function of the output control unit 230 according to the present embodiment described above, even when the length and the number of times of the non-perceptual period is the same, it is possible to present a proper summary according to each user, and effectively increase the understanding of content by each user.

Moreover, as illustrated in FIG. 12, the output control unit 230 according to the present embodiment may cause the summary generation unit 220 to generate a different summary for each user, on the basis of the non-perceptual period of each user. With the function of the output control unit 230 according to the present embodiment described above, even when the information processing terminal 10 is simultaneously used by a plurality of the users, it is possible to support the understanding of content by each user.

3.3. Flow of Control

Figure 13:
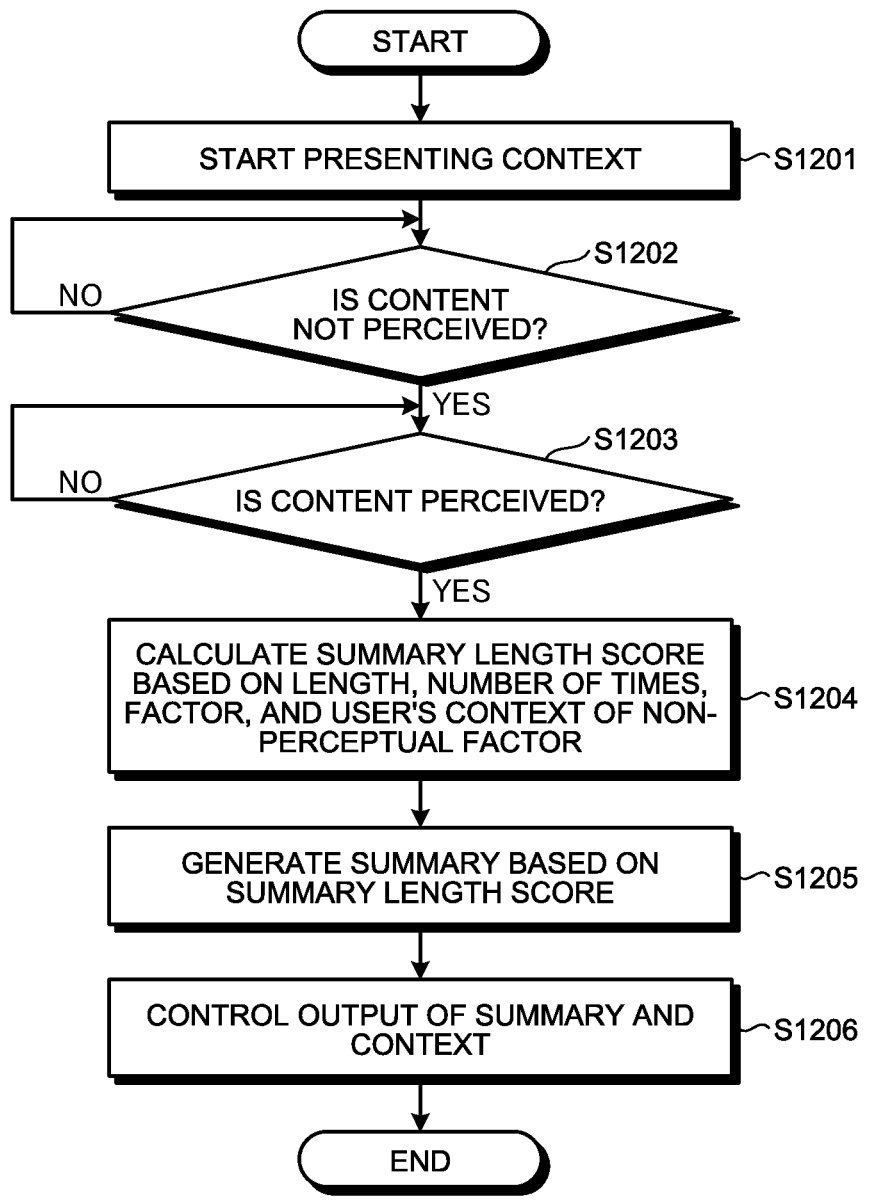
FIG. 13 is a flowchart illustrating a flow of control performed by the information processing server according to the embodiment.

Next, a flow of control performed by the information processing server 20 according to the present embodiment will be described. FIG. 13 is a flowchart illustrating a flow of control performed by the information processing server 20 according to the present embodiment.

Referring to FIG. 13, first, the output control unit 230 of the information processing server 20 causes the information processing terminal 10 to start presenting content (S1201).

When the presentation of content is started at step S1201, the output control unit 230 monitors the generation of the non-perceptual period such as the absence period and the distraction period, on the basis of the status of the user and ambient environment identified by the identification unit 210 (S1202).

In this process, when the non-perceptual period of the content is generated (Yes at S1202), the state of the output control unit 230 is changed to monitor the completion of the non-perceptual period.

Next, when the completion of the non-perceptual period of content is detected (Yes at S1203), the output control unit 230 calculates a summary length score on the basis of the length, the number of times, the factor, and the user's context of the non-perceptual period (S1204).

Next, the output control unit 230 causes the summary generation unit 220 to generate a summary with the amount of information and contents corresponding to the summary length score calculated at step S1204 (S1205).

Next, the output control unit 230 causes the information processing terminal 10 to output the summary generated by the summary generation unit 220 at step S1205, and causes the information processing terminal 10 to resume the content (S1206).

4. Modification

Next, a modification of output control performed by the information processing server 20 will be described. In the first embodiment and the second embodiment described above, the output control unit 230 controls the generation and output of the summary, on the basis of the length and the number of times of detection of the non-viewing/listening period. However, the technical idea of the present disclosure is to improve the user's convenience, by presenting a suitable summary according to the user's circumstances. Thus, the information processing server 20 according to the modification of the present disclosure may cause a summary to be generated by putting an emphasis on the user's context, and cause the information processing terminal 10 to output the summary.

FIG. 14 is a diagram for explaining a modification of the present disclosure. The information processing terminal 10 illustrated in FIG. 14 is an agent device that performs voice interaction with a user, on the basis of control performed by the information processing server 20. The example in FIG. 14 illustrates a scene when the information processing terminal 10 is used by the users at home.

For example, in the upper row of FIG. 14, at 12 p.m., a user U7 who is a mother is planning a family trip by interacting with the information processing terminal 10. Under these circumstances, the user U7 is supplying the contents of the determined items into the information processing terminal 10 by speech U014. In this example, the speech U014 includes contents on the travel destination, activities, budget, and a surprise party for the user U8 who is a son of the user U7. Moreover, the user U7 supplies the speech U014 into the information processing terminal 10 as information to be shared with the other users in the family.

Next, as illustrated in the middle row of FIG. 14, at 4 p.m., the identification unit 210 detects the user U8 who is a son of the user U7 has come home. Consequently, the output control unit 230 causes the information processing terminal 10 to output voice speech SO14a including a summary A14a of the speech U014 supplied by the user U7. Under these circumstances, the output control unit 230 causes the summary generation unit 220 to generate the summary A14a including the information on the travel destination and activities alone, among the pieces of information supplied by the speech U014.

In other words, the output control unit 230 causes the summary A12 from which the information on the budget and the surprise party are purposely excluded to be presented to the user U8. More specifically, the output control unit 230 excludes the information on the budget from the summary A12a, on the basis that the attribute of the user U8 is a child. Moreover, from vocabularies such as a "son" and "surprise" included in the speech U014, the output control unit 230 estimates that the target of the surprise party is the user U8, and controls the summary A14a so that the information on the surprise party is not included in the summary A14a.

In this manner, the output control unit 230 according to the present modification may control the generation and presentation of a summary by putting an emphasis on the user's context. With the function of the output control unit 230 according to the present embodiment described above, even in an environment such as at home where the users with different knowledge level and social maturity coexist, it is possible to present a summary including suitable information according to each of the users.

Meanwhile, as illustrated in the lower row of FIG. 14, at 7 p.m., the identification unit 210 detects the user U9 who is a husband of the user U7 has come home. Consequently, the output control unit 230 causes the information processing terminal 10 to output voice speech SO14b including a summary A14b of the speech U014 supplied by the user U7. Under these circumstances, unlike the summary A14a, the output control unit 230 causes the summary generation unit 220 to generate the summary A14b including all items excluding the activities among the information supplied by the speech U014.

For example, on the basis that the user U9 usually does not give much opinion on the activities at the travel destination, the output control unit 230 can cause the summary generation unit 220 to generate the summary A14b as described above.

A modification of the output control performed by the information processing server 20 has been described. As described with reference to FIG. 14, the technical idea according to the present disclosure may be modified in various forms. Moreover, with the technical idea according to the present disclosure, it is possible to provide a suitable summary according to the circumstances to the user, and effectively improve the user convenience.

5. Example of Hardware Configuration

Figure 15:
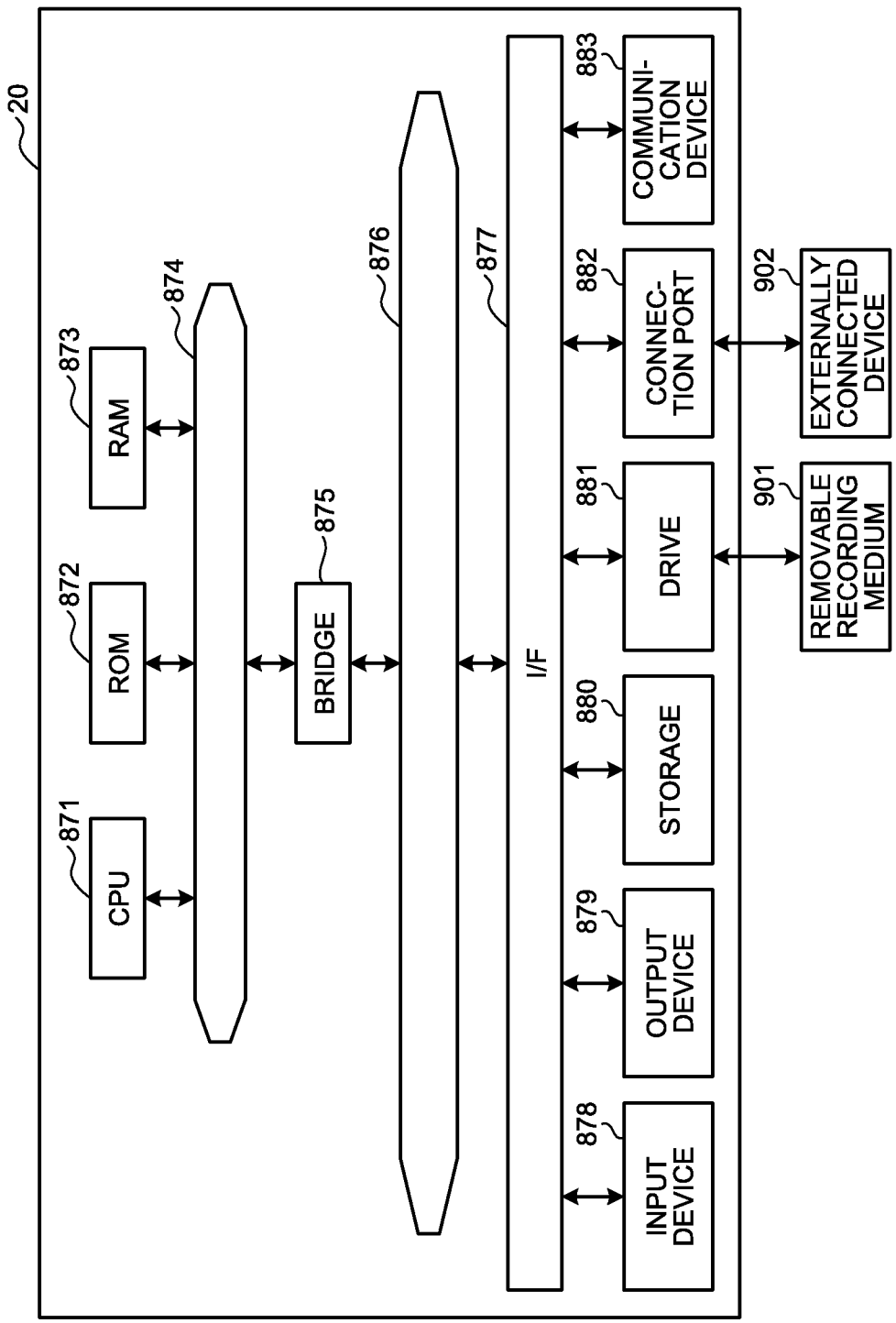
FIG. 15 is a diagram illustrating an example of a hardware configuration according to one embodiment of the present disclosure.

Next, an example of a hardware configuration common to the information processing terminal 10 and the information processing server 20 according to one embodiment of the present disclosure will be described. FIG. 15 is a block diagram illustrating an example of a hardware configuration of the information processing terminal 10 and the information processing server 20 according to one embodiment of the present disclosure. Referring to FIG. 15, for example, the information processing terminal 10 and the information processing server 20 include a central processing unit (CPU) 871, a read-only memory (ROM) 872, a random-access memory (RAM) 873, a host bus 874, a bridge 875, an external bus 876, an interface 877, an input device 878, an output device 879, a storage 880, a drive 881, a connection port 882, and a communication device 883. The hardware configuration illustrated in this example is merely an example, and a part of the components may be omitted. Moreover, the hardware configuration may also include a component in addition to the components illustrated in the example.

CPU 871

For example, the CPU 871 functions as an arithmetic processing device or a control device, and controls the overall operation or a part of the operation of the components on the basis of various computer programs recorded in the ROM 872, the RAM 873, the storage 880, or a removable recording medium 901.

ROM 872 and RAM 873

The ROM 872 is a means for storing computer programs to be read by the CPU 871, data used for calculation, and the like. For example, the RAM 873 temporarily or permanently stores therein computer programs to be read by the CPU 871, and various parameters and the like that suitably change when the computer programs are executed.

Host Bus 874, Bridge 875, External Bus 876, and Interface 877

For example, the CPU 871, the ROM 872, and the RAM 873 are connected to each other via the host bus 874 capable of transmitting high-speed data. For example, the host bus 874 is connected to the external bus 876 that has a relatively slow data transmission speed via the bridge 875. Moreover, the external bus 876 is connected to various components via the interface 877.

Input Device 878

For example, the input device 878 includes a mouse, a keyboard, a touch panel, a button, a switch, a lever, and the like. The input device 878 also includes a remote controller (hereinafter, remote controller) that can transmit control signals by using infrared ray and other radio waves. Moreover, the input device 878 includes a voice input device such as a microphone.

Output Device 879

For example, the output device 879 is a device that can visually and aurally notify a user of acquired information. The output device 879 includes a display device such as a cathode ray tube (CRT), a liquid crystal display (LCD), or an organic electroluminescence (EL); an audio output device such as a speaker and a head phone; a printer; a mobile phone; or a facsimile. Moreover, the output device 879 according to the present disclosure includes various oscillation devices capable of outputting tactile stimulation.

Storage 880

The storage 880 is a device for storing various types of data. For example, the storage 880 includes a magnetic storage device such as a hard disk drive (HDD), a semiconductor storage device, an optical storage device, a magneto-optical storage device, or the like.

Drive 881

For example, the drive 881 is a device that reads out information recorded in the removable recording medium 901 such as a magnetic disk, an optical disk, a magneto-optical disk, or a semiconductor memory; or writes information into the removable recording medium 901.

Removable Recording Medium 901

For example, the removable recording medium 901 is digital versatile disc (DVD) media, Blu-ray (registered trademark) media, high-definition (HD) DVD media, various semiconductor storage media, and the like. For example, the removable recording medium 901 may also be an integrated circuit (IC) card mounted with a contactless IC chip, an electronic device, or the like.

Connection Port 882

For example, the connection port 882 is a universal serial bus (USB) port, an Institute of Electrical and Electronics Engineers (IEEE) 1394 port, a small computer system interface (SCSI), a recommended standard (RS)-232C port, or a port for connecting an external connection device 902 such as an optical audio terminal.

External Connection Device 902

For example, the external connection device 902 is a printer, a portable music player, a digital camera, a digital video camera, an IC recorder, or the like.

Communication Device 883

The communication device 883 is a communication device for connecting to a network. For example, the communication device 883 is a wired or wireless local area network (LAN), Bluetooth (registered trademark), or a communication card for a wireless USB (WUSB). The communication device 883 may also be a router for optical communication, a router for asymmetric digital subscriber line (ADSL), a modem for various types of communication, or the like.

6. Conclusion

As described above, one of the features of the information processing server 20 according to one embodiment of the present disclosure is to output a summary of content, when a non-viewing/listening period is detected in the viewing and listening behavior of a user corresponding to the content. Moreover, the information processing server 20 according to one embodiment of the present disclosure has a function to determine an amount of information in a summary of the content, on the basis of the length of the non-viewing/listening period. With the configuration, it is possible to allow the user to effectively perceive the flow of content.

The preferred embodiments of the present disclosure have been described in detail with reference to the accompanying drawings. However, the technical scope of the present disclosure is not limited to the examples. It will be apparent to those skilled in the art of the present disclosure that various modifications and alterations can be conceived within the scope of the technical idea described in the claims. It is naturally understood that such modifications and alterations are also included in the technical scope of the present disclosure.

Moreover, the effects described in the present specification are merely illustrative or exemplified effects, and are not limitative. That is, with or in the place of the above effects, the technology according to the present disclosure may achieve other effects that are clear to those skilled in the art from the description of the present specification.

Furthermore, the processing steps of the information processing server 20 of the present specification need not always be processed in time series along the order described in the flowchart. For example, the steps according to the processes of the information processing server 20 may be processed in a different order described in the flowchart, or may be processed in parallel.

The following configurations also belong to the technical scope of the present disclosure.

(1)

An information processing device, comprising: an output control unit that controls presentation of content to a user, and when a non-viewing/listening period is detected in a viewing and listening behavior of the user corresponding to the content, causes a summary of the content to be output, wherein the output control unit determines an amount of information in the summary of the content, based on a length of the non-viewing/listening period.

(2)

The information processing device according to (1), wherein the output control unit determines the amount of information in the summary, based on number of times of detection of the non-viewing/listening period.

(3)

The information processing device according to (1) or (2), wherein the output control unit determines the amount of information in the summary, based on a generation factor of the non-viewing/listening period.

(4)

The information processing device according to any one of (1) to (3), wherein the output control unit determines the amount of information or contents of the summary, based on a user's context of the user.

(5)

The information processing device according to any one of (1) to (4), wherein
the non-viewing/listening period includes an interruption period of the content, and
the output control unit determines the amount of information in the summary, based on a length of the interruption period or number of times of detection of the interruption period.

(6)

The information processing device according to (5), wherein the output control unit controls the presentation of the content to be interrupted or resumed, and causes the summary to be output when the content is resumed.

(7)

The information processing device according to (6), wherein the output control unit causes the summary of contents of the content presented before the interruption period to be output, when the content is resumed.

(8)

The information processing device according to (6) or (7), wherein the output control unit determines a resume position of the content, based on the interruption period of the content.

(9)

The information processing device according to any one of (5) to (8), wherein the output control unit causes the content to be interrupted, based on an ambient environment while the content is being presented.

(10)

The information processing device according to any one of (5) to (9), wherein the output control unit causes the content to be interrupted, based on ambient sound while the content is being presented.

(11)

The information processing device according to any one of (5) to (10), wherein the output control unit causes the content to be interrupted, based on status of the user while the content is being presented.

(12)

The information processing device according to any one of (1) to (11), wherein
the non-viewing/listening period includes a non-perceptual period during which the user does not perceive the content being presented, and the output control unit determines the amount of information in the summary, based on a length of the non-perceptual period or number of times of detection of the non-perceptual period.

(13)

The information processing device according to (12), wherein the non-perceptual period includes an absence period during which the user has left an area where the content is supplied while the content is being presented, and the output control unit determines the amount of information in the summary, based on a length of the absence period or number of times of detection of the absence period.

(14)

The information processing device according to (12) or (13), wherein the non-perceptual period includes a distraction period during which the user is not concentrating on information of the content while the content is being presented, and the output control unit determines the amount of information in the summary, based on a length of the distraction period or number of times of detection of the distraction period.

(15)

The information processing device according to any one of (12) to (14), wherein when the non-perceptual period is finished, the output control unit causes the summary to be output.

(16)

The information processing device according to any one of (12) to (15), wherein the output control unit controls an output of the summary including information presented during the non-perceptual period.

(17)

The information processing device according to any one of (12) to (16), wherein the output control unit causes the summary different for each of a plurality of the users to be output, based on the non-perceptual period of each of the users.

(18)

The information processing device according to any one of (1) to (17), wherein the output control unit controls voice speech of the content, and determines a speech length of the summary, based on the length of the non-viewing/listening period or number of times of detection of the non-viewing/listening period.

(19)

The information processing device according to (1), further comprising a voice output unit that outputs voice speech of the content and the summary, based on control performed by the output control unit.

(20)

An information processing method, comprising:

by a processor, controlling presentation of content to a user; and when a non-viewing/listening period is detected in a viewing and listening behavior of the user corresponding to the content, causing a summary of the content to be output, wherein the causing the summary of the content to be output further includes determining an amount of information in the summary of the content, based on a length of the non-viewing/listening period.

REFERENCE SIGNS LIST 10 information processing terminal
110 display unit
120 voice output unit
130 voice input unit
140 imaging unit
150 sensor unit
160 control unit
170 server communication unit
20 information processing server
210 identification unit
220 summary generation unit
230 output control unit
240 voice synthesizing unit
250 storage unit
252 user DB
254 viewing/listening record DB
256 content DB
260 terminal communication unit

The invention claimed is:

1. An information processing device comprising circuitry configured to:

present content to a user;

interrupt the presentation of the content when a non-viewing/listening period having an interruption period is detected based on a viewing and listening behavior of the user corresponding to the content;

determine an amount of information in a summary of the content based on a length of the interruption period, the summary of the content including a summary of the contents of the content presented before the interruption period;

resume presentation of the content to the user at the end of the interruption period from a position at which the presentation of the content was interrupted; and output the summary of the content when the presentation of the content to the user is resumed.

2. The information processing device according to claim 1, wherein the circuitry is further configured to determine the amount of information in the summary based on number of times of detection of the non-viewing/listening period.

3. The information processing device according to claim 1, wherein the circuitry is further configured to determine the amount of information in the summary based on a generation factor of the non-viewing/listening period.

4. The information processing device according to claim 1, wherein the circuitry is further configured to determine the amount of information or contents of the summary based on a user's context of the user.

5. The information processing device according to claim 1, wherein the non-viewing/listening period includes an interruption period of the content, and the circuitry is further configured to determine the amount of information in the summary based on a number of times of detection of the interruption period.

6. The information processing device according to claim 5, wherein the circuitry is further configured to cause the content to be interrupted based on an ambient environment while the content is being presented.

7. The information processing device according to claim 5, wherein the circuitry is further configured to cause the content to be interrupted based on ambient sound while the content is being presented.

8. The information processing device according to claim 5, wherein the circuitry is further configured to cause the content to be interrupted based on status of the user while the content is being presented.

9. The information processing device according to claim 1, wherein the non-viewing/listening period includes a non-perceptual period during which the user does not perceive the content being presented, and the circuitry is further configured to determine the amount of information in the summary based on a length of the non-perceptual period or number of times of detection of the non-perceptual period.

10. The information processing device according to claim 9, wherein the non-perceptual period includes an absence period during which the user has left an area where the content is supplied while the content is being presented, and the circuitry is further configured to determine the amount of information in the summary based on a length of the absence period or number of times of detection of the absence period.

11. The information processing device according to claim 9, wherein the non-perceptual period includes a distraction period during which the user is not concentrating on information of the content while the content is being presented, and the circuitry is further configured to determine the amount of information in the summary based on a length of the distraction period or number of times of detection of the distraction period.

12. The information processing device according to claim 9, wherein when the non-perceptual period is finished, the circuitry is further configured to cause the summary to be output.

13. The information processing device according to claim 9, wherein the circuitry is further configured to control an output of the summary including information presented during the non-perceptual period.

14. The information processing device according to claim 9, wherein the circuitry is further configured to cause the summary different for each of a plurality of the users to be output based on the non-perceptual period of each of the users.

15. The information processing device according to claim 1, wherein the circuitry is further configured to control voice speech of the content, and determines a speech length of the summary based on the length of the non-viewing/listening period or number of times of detection of the non-viewing/listening period.

16. The information processing device according to claim 1, wherein the circuitry is further configured to output voice speech of the content and the summary based on control performed by the output control unit.

17. An information processing method in which a processor is configured to carry out the method comprising:

presenting content to a user;

interrupting the presentation of the content when a non-viewing/listening period having an interruption period is detected based on a viewing and listening behavior of the user corresponding to the content;

determining an amount of information in the summary of the content based on a length of the interruption period, the summary of the content including a summary of the contents of the content presented before the interruption period;

resuming presentation of the content to the user at the end of the interruption period from a position at which the presentation of the content was interrupted; and outputting the summary of the content when the presentation of the content to the user is resumed.

* * * * *